United States Patent
Hakotani et al.

(10) Patent No.: US 12,522,702 B2
(45) Date of Patent: Jan. 13, 2026

(54) THIN PLATE MOLDING MATERIAL AND MOLDED ARTICLE

(71) Applicant: JAPAN COMPOSITE CO., LTD., Tokyo (JP)

(72) Inventors: Masahiro Hakotani, Shizuoka (JP); Hirokuni Fujita, Shizuoka (JP); Takashi Tsukamoto, Shizuoka (JP)

(73) Assignee: JAPAN COMPOSITE CO., LTD., Tokyo (JP)

( * ) Notice: Subject to any disclaimer, the term of this patent is extended or adjusted under 35 U.S.C. 154(b) by 361 days.

(21) Appl. No.: 17/921,140

(22) PCT Filed: Apr. 22, 2021

(86) PCT No.: PCT/JP2021/016305
§ 371 (c)(1),
(2) Date: Oct. 25, 2022

(87) PCT Pub. No.: WO2021/220934
PCT Pub. Date: Nov. 4, 2021

(65) Prior Publication Data
US 2023/0183433 A1    Jun. 15, 2023

(30) Foreign Application Priority Data
Apr. 28, 2020    (JP) .................. 2020-079583

(51) Int. Cl.
| | | |
|---|---|---|
| *C08J 5/04* | (2006.01) | |
| *C08J 5/10* | (2006.01) | |
| *C08J 5/18* | (2006.01) | |
| *C08J 5/24* | (2006.01) | |
| *C08K 3/013* | (2018.01) | |
| *C08K 3/04* | (2006.01) | |
| *C08K 3/40* | (2006.01) | |
| *C08K 7/06* | (2006.01) | |
| *C08K 7/14* | (2006.01) | |
| *C08K 7/28* | (2006.01) | |
| *C08K 13/04* | (2006.01) | |
| *C08L 67/06* | (2006.01) | |
| *C08L 87/00* | (2006.01) | |
| *B29B 11/16* | (2006.01) | |
| *B29C 70/00* | (2006.01) | |
| *B29C 70/02* | (2006.01) | |
| *B29K 267/00* | (2006.01) | |
| *B29K 307/04* | (2006.01) | |
| *B29K 309/08* | (2006.01) | |
| *B32B 27/04* | (2006.01) | |
(Continued)

(52) U.S. Cl.
CPC .............. *C08J 5/18* (2013.01); *C08J 5/042* (2013.01); *C08J 5/043* (2013.01); *C08J 5/047* (2013.01); *C08J 5/10* (2013.01); *C08J 5/249* (2021.05); *C08K 3/013* (2018.01); *C08K 3/04* (2013.01); *C08K 3/40* (2013.01); *C08K 7/14* (2013.01); *C08K 7/28* (2013.01); *C08K 13/04* (2013.01); *C08L 67/06* (2013.01); *C08L 87/00* (2013.01); *B29B 11/16* (2013.01); *B29C 70/003* (2021.05); *B29C 70/02* (2013.01); *B29C 70/025* (2013.01); *B29K 2267/06* (2013.01); *B29K 2307/04* (2013.01); *B29K 2309/08* (2013.01); *B32B 27/04* (2013.01); *B32B 27/20* (2013.01); *B32B 27/36* (2013.01); *C08J 5/243* (2021.05); *C08J 5/244* (2021.05); *C08J 5/247* (2021.05); *C08J 2325/06* (2013.01); *C08J 2367/06* (2013.01); *C08J 2423/06* (2013.01); *C08J 2431/04* (2013.01); *C08J 2463/10* (2013.01); *C08J 2467/06* (2013.01); *C08K 3/046* (2017.05); *C08K 2003/222* (2013.01); *C08K 2003/265* (2013.01); *C08K 5/098* (2013.01); *C08K 7/06* (2013.01); *C08K 7/20* (2013.01); *C08K 2201/004* (2013.01); *C08K 2201/005* (2013.01); *C08K 2201/016* (2013.01); *C08L 25/06* (2013.01); *C08L 101/00* (2013.01); *C08L 2205/02* (2013.01); *C08L 2205/035* (2013.01); *Y10T 428/25* (2015.01); *Y10T 428/252* (2015.01); *Y10T 428/269* (2015.01)

(58) Field of Classification Search
None
See application file for complete search history.

(56) References Cited

U.S. PATENT DOCUMENTS

| | | | | |
|---|---|---|---|---|
| 3,230,184 A | * | 1/1966 | Alford ............... | C08K 7/20 |
| | | | | 521/54 |
| 3,499,955 A | * | 3/1970 | Shannon ............ | B29C 70/12 |
| | | | | 106/688 |

(Continued)

FOREIGN PATENT DOCUMENTS

| | | | |
|---|---|---|---|
| CN | 102634184 A | * | 8/2012 |
| CN | 103183942 A | * | 7/2013 |

(Continued)

OTHER PUBLICATIONS

Machine Translation of JP-11240931-A, Sep. 1999 (Year: 1999).*
Machine Translation of JP-2019181857-A, Oct. 2019 (Year: 2019).*
Soni et al., Synthesis and Characterization of Epoxy based Hybrid Composite Reinforced with Glass Fiber and Milled Carbon, 2018, Materials Today: Proceedings, vol. 5, No. 2, Part 1, pp. 4050-4058 (Year: 2018).*

(Continued)

*Primary Examiner* — Jeffrey A Vonch
(74) *Attorney, Agent, or Firm* — RANKIN, HILL & CLARK LLP

(57) ABSTRACT

A thin plate molding material includes a resin composition containing a resin component and a filling material, and a reinforced fiber with a predetermined fiber length. The content ratio of the reinforced fiber is a predetermined ratio. The mixing ratio of the resin component is a predetermined ratio.

3 Claims, No Drawings

(51) Int. Cl.
  *B32B 27/20* (2006.01)
  *B32B 27/36* (2006.01)
  *C08K 3/22* (2006.01)
  *C08K 3/26* (2006.01)
  *C08K 5/098* (2006.01)
  *C08K 7/20* (2006.01)
  *C08L 25/06* (2006.01)
  *C08L 101/00* (2006.01)

(56) References Cited

U.S. PATENT DOCUMENTS

| | | | | | |
|---|---|---|---|---|---|
| 4,517,323 | A | * | 5/1985 | Ferguson | B29C 70/025 264/258 |
| 4,784,920 | A | * | 11/1988 | Machida | B29C 53/04 156/306.9 |
| 5,001,172 | A | * | 3/1991 | Tsuchiya | C08K 7/04 523/222 |
| 5,178,706 | A | * | 1/1993 | Nishibara | B32B 37/144 264/108 |
| 5,236,976 | A | * | 8/1993 | Michaels | C08K 7/14 525/49 |
| 5,470,886 | A | * | 11/1995 | Makhlouf | C08J 9/32 523/206 |
| 6,592,986 | B1 | * | 7/2003 | Hakotani | H01B 1/24 428/297.4 |
| 2002/0122943 | A1 | * | 9/2002 | Van Dijk | B29C 70/502 428/408 |
| 2003/0092823 | A1 | * | 5/2003 | Steinhausler | C08L 67/06 524/425 |
| 2003/0100651 | A1 | * | 5/2003 | Guha | C08K 7/02 524/425 |
| 2005/0238864 | A1 | * | 10/2005 | D'Souza | C08J 9/32 428/297.4 |
| 2006/0093802 | A1 | * | 5/2006 | Tsai | B32B 15/20 428/216 |
| 2006/0252869 | A1 | * | 11/2006 | Twardowska-Baxter | C08K 3/34 524/445 |
| 2006/0258781 | A1 | * | 11/2006 | Beach | C08G 18/837 523/217 |
| 2006/0270810 | A1 | * | 11/2006 | Yasumura | C08F 290/064 525/529 |
| 2006/0281838 | A1 | * | 12/2006 | Steinhausler | C09D 167/06 524/401 |
| 2008/0237914 | A1 | * | 10/2008 | Lustiger | C08J 5/047 264/143 |
| 2011/0263756 | A1 | * | 10/2011 | Yano | C08J 5/045 524/13 |
| 2013/0196138 | A1 | * | 8/2013 | Fusco | B29C 70/12 422/135 |
| 2015/0376350 | A1 | * | 12/2015 | Guha | C08K 7/02 524/188 |
| 2016/0280890 | A1 | * | 9/2016 | Kumar | C08K 11/005 |
| 2017/0298199 | A1 | * | 10/2017 | Akiyama | C08J 5/249 |
| 2017/0313872 | A1 | * | 11/2017 | Watanabe | C08L 63/00 |
| 2019/0040163 | A1 | * | 2/2019 | Konami | C08J 5/04 |
| 2019/0119488 | A1 | * | 4/2019 | Guha | C08L 75/02 |
| 2019/0134927 | A1 | * | 5/2019 | Kim | B29C 70/18 |
| 2019/0225759 | A1 | * | 7/2019 | Laux | D06M 15/51 |
| 2019/0248107 | A1 | * | 8/2019 | Hatanaka | B32B 5/26 |
| 2019/0276617 | A1 | * | 9/2019 | Kia | C08J 5/04 |
| 2020/0131297 | A1 | * | 4/2020 | Tsuchiya | C08J 5/243 |
| 2020/0165410 | A1 | * | 5/2020 | Kamar | C08K 3/042 |
| 2020/0299470 | A1 | * | 9/2020 | Tachon | B29C 43/003 |
| 2020/0377687 | A1 | * | 12/2020 | Park | C08L 75/04 |
| 2020/0406671 | A1 | * | 12/2020 | Denmead | C08K 7/06 |
| 2020/0407886 | A1 | * | 12/2020 | Nabeshima | B29C 43/006 |
| 2022/0106448 | A1 | * | 4/2022 | Beale | E04H 4/00 |

FOREIGN PATENT DOCUMENTS

| | | | | |
|---|---|---|---|---|
| CN | 103540104 | A | * | 1/2014 |
| CN | 105482399 | A | * | 4/2016 | C08L 67/06 |
| CN | 105907046 | A | * | 8/2016 | C08L 63/10 |
| CN | 106633742 | A | * | 5/2017 | C08J 5/08 |
| CN | 107057312 | A | * | 8/2017 | B29C 70/345 |
| CN | 109651787 | A | * | 4/2019 | C08L 67/06 |
| DE | 3716861 | A1 | * | 12/1988 | C08K 5/19 |
| DE | 102011100549 | A1 | * | 2/2012 | C08J 5/247 |
| GB | 2258235 | A | * | 2/1993 | C08K 3/22 |
| JP | 04247911 | A | * | 9/1992 | |
| JP | H06240076 | A | | 8/1994 | |
| JP | 09118830 | A | * | 5/1997 | |
| JP | 09208818 | A | * | 8/1997 | |
| JP | 10036459 | A | * | 2/1998 | |
| JP | 11240931 | A | * | 9/1999 | |
| JP | 2001294633 | A | * | 10/2001 | |
| JP | 2003212979 | A | * | 7/2003 | |
| JP | 2004035714 | A | * | 2/2004 | |
| JP | 2005023192 | A | * | 1/2005 | |
| JP | 2005154747 | A | * | 6/2005 | |
| JP | 2005247879 | A | * | 9/2005 | |
| JP | 2006103193 | A | * | 4/2006 | |
| JP | 2006274006 | A | * | 10/2006 | |
| JP | 2007002060 | A | * | 1/2007 | |
| JP | 2009007464 | A | * | 1/2009 | |
| JP | 2009-29921 | A | | 2/2009 | |
| JP | 2009209269 | A | * | 9/2009 | |
| JP | 2010065150 | A | * | 3/2010 | |
| JP | 2015178621 | A | * | 10/2015 | |
| JP | 2016124102 | A | * | 7/2016 | |
| JP | 2017114936 | A | * | 6/2017 | |
| JP | 2017119774 | A | * | 7/2017 | |
| JP | 2017141314 | A | * | 8/2017 | |
| JP | 2017160335 | A | * | 9/2017 | |
| JP | 2018039892 | A | * | 3/2018 | |
| JP | 2018048238 | A | * | 3/2018 | |
| JP | 2018104542 | A | * | 7/2018 | |
| JP | 2018197295 | A | * | 12/2018 | |
| JP | 2019137774 | A | * | 8/2019 | |
| JP | 2019181857 | A | * | 10/2019 | |
| KR | 20020031720 | A | * | 5/2002 | |
| KR | 2012073938 | A | * | 7/2012 | |
| WO | WO-8702687 | A1 | * | 5/1987 | C08L 67/06 |
| WO | WO-2013110139 | A1 | * | 8/2013 | B29C 70/58 |
| WO | WO-2014045971 | A1 | * | 3/2014 | C08J 5/046 |

OTHER PUBLICATIONS

Cholake et al., Improved Mode I fracture resistance of CFRP composites by reinforcing epoxy matrix with recycled short milled carbon fibre, May 2016, Construction and Building Materials, vol. 111, pp. 399-407 (Year: 2016).*
Machine Translation for JP2003212979A, Jul. 2003 (Year: 2003).*
Machine Translation for JP2004035714A, Feb. 2004 (Year: 2004).*
Machine Translation for JP2005154747A, Jun. 2005 (Year: 2005).*
Machine Translation for JP2006103193A, Apr. 2006 (Year: 2006).*
Machine Translation for JP2009209269A, Sep. 2009 (Year: 2009).*
Machine Translation for JP2019137774A, Aug. 2019 (Year: 2019).*

* cited by examiner

THIN PLATE MOLDING MATERIAL AND MOLDED ARTICLE

The present invention relates to a thin plate molding material and a molded article, and in particular to a thin plate molding material and a molded article including a cured product of the thin plate molding material.

BACKGROUND ART

Conventionally, a molded article made of a molding material including an unsaturated polyester resin (particularly, SMC (sheet molding compound)) has been used in a variety of fields due to its excellent appearance, mechanical properties, water resistance, corrosion resistance, and the like.

As such a molding material, for example, a molding material including an unsaturated polyester, a filling material, and a reinforced fiber has been proposed (for example, Patent document 1 below).

CITATION LIST

Patent Document

Patent Document 1: Japanese Unexamined Patent Publication No. 2009-29921

SUMMARY OF THE INVENTION

Problem to be Solved by the Invention

Such a molding material may be used for car components mainly for weight reduction. Specifically, the density (reduction), mechanical properties (improvement), and plate thickness (thinning) of the molded article are important for weight reduction. Particularly, reducing the plate thickness has mainly been employed as a weight reduction technique that can reduce the amount of the necessary materials for the components and thus can achieve not only weight reduction (weight loss) but also cost reduction and effective resource utilization. Further, the components for inner panels such as door stiffeners also require weight reduction. For the weight reduction, it is necessary to use a molding material with low density and excellent mechanical properties, namely, with excellent specific strength and specific rigidity in order to allow the component to satisfy the desired strength and rigidity. At the same time, it is necessary to form the molding material into a thin plate having a complex cross-sectional shape, such as a bead shape, to achieve a high section modulus of the cross section in order to achieve the weight reduction of the component. Accordingly, the molding material for forming such inner panels is required to have a moldability to be molded into a thin and complex shape.

For example, the mechanical properties of the molding material of such a product can be improved by the increase in the reinforced fiber content in the molding material. However, when a widely-used glass fiber is employed as the reinforced fiber, the density of the glass fiber is high and thus the weight reduction effect decreases. In addition, the reinforced fiber generally reduces the fluidity of the molding material. This makes it difficult to form the molding material into a thin plate. Further, the formation of the molding material into a thin plate requires the mechanical properties of the molding material that can provide even a thinned component with sufficient strength and rigidity (in other words, to satisfy the strength and rigidity of the component, the thinning can only be carried out to a degree commensurate with the mechanical properties of the molding material). Thus, there is a disadvantage that a mere increase in the reinforced fiber content is not enough to simultaneously achieve the above-described thin plate moldability and mechanical properties of the molding material.

In the molding material of Example 1 of the prior art document, the total amount of the components excluding the filling material and the reinforced fiber (hereinafter, referred to as resin component) is 48 vol %, i.e., small. Further, the content ratio of the reinforced fiber is 20 vol %, i.e., low. When the molding material contains a relatively high ratio of the filling material, the molding material can provide a car outer plate with a required high smoothness but has a poor thin plate moldability. Hence, the moldability (thin plate moldability) in conformity with a mold for producing a thin plate (for example, with a plate thickness of 1.5 mm) is reduced. Further, the molding material fails to have specific strength and specific rigidity enough to provide the component in the form of a thin plate (for example, with a plate thickness of 1.5 mm) with strength and rigidity.

The present invention provides a thin plate molding material having excellent moldability (thin plate moldability) in conformity with a mold for producing a thin plate and also having excellent specific strength and specific rigidity enough to provide even a component in the form of a thin plate with strength and rigidity, and also provides a molded article including a cured product of the thin plate molding material.

Means for Solving the Problem

The present invention [1] includes a thin plate molding material comprising: a resin composition containing a resin component and a filling material; and a reinforced fiber with a fiber length of 10 mm or more and 60 mm or less, wherein a content ratio of the reinforced fiber is 21 vol % or more and 28 vol % or less, and a mixing ratio of the resin component is 49 vol % or more and 56 vol % or less.

The present invention [2] includes the thin plate molding material described in [1], wherein the reinforced fiber has an aspect ratio of 500 or more.

The present invention [3] includes the thin plate molding material described in [1] or [2], wherein the filling material contains a filler having an average value of maximum particle lengths of 15 μm or more and 300 μm or less.

The present invention [4] includes the thin plate molding material described in [3], wherein the filler is a hollow glass with an average value of maximum particle lengths of 15 μm or more and 50 μm or less.

The present invention [5] includes the thin plate molding material described in [3], wherein the filler is milled carbon fibers with an average value of maximum lengths of 100 μm or more and 300 μm or less.

The present invention [6] includes the thin plate molding material described in any one of the above-described [1] to [5], wherein the resin component contains a double bond-containing curable polymer, and the double bond-containing curable polymer has a double bond equivalent of 200 g/eq. or more and 350 g/eq. or less.

The present invention [7] includes a molded article comprising: a cured product of the thin plate molding material described in any one of the above-described [1] to [6], the molded article having a thickness of 1.5 mm or less.

Effects of the Invention

The thin plate molding material of the present invention contains a resin composition containing a resin component and a filling material and a reinforced fiber having a predetermined fiber length. Further, the reinforced fiber is contained in a predetermined ratio, and the resin component is blended in a predetermined ratio.

Thus, the thin plate molding material of the present invention has an excellent moldability (thin plate moldability) in conformity with a mold for producing a thin plate, and can be molded into a molded article with excellent specific strength and specific rigidity to provide even a component in the form of a thin plate with strength and rigidity.

The molded article of the present invention includes a cured product of the thin plate molding material of the present invention. Thus, the specific strength, specific rigidity, and thin plate moldability of the thin plate molding material allows for the provision of a light component satisfying required strength and rigidity.

DESCRIPTION OF THE EMBODIMENTS

The thin plate molding material of the present invention contains a resin composition and a reinforced fiber with a predetermined fiber length.

The resin composition contains a resin component and a filling material.

The resin component contains a double bond-containing curable polymer and a polymerizable monomer.

Examples of the double bond-containing curable polymer include unsaturated polyesters and vinyl esters.

The unsaturated polyester is a polymerization product of a polybasic acid and a polyhydric alcohol.

The polybasic acid includes a polybasic acid that has an ethylenically unsaturated double bond (hereinafter, referred to as an ethylenically unsaturated bond-containing polybasic acid) as an essential component, and a polybasic acid that does not have an ethylenically unsaturated double bond (hereinafter, referred to as an ethylenically unsaturated bond-free polybasic acid) as an optional component.

Examples of the ethylenically unsaturated bond-containing polybasic acid include ethylenically unsaturated aliphatic dibasic acids such as maleic acid, fumaric acid, itaconic acid, and dihydromuconic acid, halides of these acids, and alkyl esters of these acids.

Further, examples of the ethylenically unsaturated bond-containing polybasic acid include an acid anhydride derived from the above-described ethylenically unsaturated aliphatic dibasic acid, for example, maleic anhydride.

As the ethylenically unsaturated bond-containing polybasic acid, a maleic anhydride and a fumaric acid are preferable.

Examples of the ethylenically unsaturated bond-free polybasic acid include saturated aliphatic polybasic acids, saturated alicyclic polybasic acids, aromatic polybasic acids, halides of these acids, and alkyl esters of these acids.

Examples of the saturated aliphatic polybasic acid include saturated aliphatic dibasic acids such as oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethyl succinic acid, adipic acid, pimelic acid, suberic acid, azelaic acid, and sebacic acid.

Also, examples of the saturated aliphatic polybasic acid include an acid anhydride derived from the above-described saturated aliphatic dibasic acid, for example, oxalic anhydride, and succinic anhydride.

Examples of the saturated alicyclic polybasic acid include saturated alicyclic dibasic acids such as HET acid, 1,2-hexahydrophthalic acid, 1,1-cyclobutanedicarboxylic acid, 1,4-cyclohexanedicarboxylic acid (cis- or trans-1,4-cyclohexanedicarboxylic acid or a mixture thereof), and dimer acid.

Further, examples of the saturated alicyclic polybasic acid include an acid anhydride derived from the above-described saturated alicyclic dibasic acid, for example, HET acid anhydride.

Examples of the aromatic polybasic acid include aromatic dibasic acids such as phthalic acid (orthophthalic acid, isophthalic acid, and terephthalic acid), trimellitic acid, and pyromellitic acid.

Also, examples of the aromatic polybasic acid include an acid anhydride derived from the above-described aromatic dibasic acid, for example, phthalic anhydride.

As the ethylenically unsaturated bond-free polybasic acid, an aromatic polybasic acid is preferable, an aromatic dibasic acid is more preferable, a phthalic acid is further more preferable, and an isophthalic acid is particularly preferable.

These polybasic acids may be used alone or in combination of two or more.

When an ethylenically unsaturated bond-containing polybasic acid and an ethylenically unsaturated bond-free polybasic acid are used in combination, the mixing ratio of the ethylenically unsaturated bond-containing polybasic acid to the polybasic acid is, for example, 40 mol % or more, and, for example, 70 mol % or less.

Examples of the polyhydric alcohol include alkanediols such as ethylene glycol, propylene glycol (1,2- or 1,3-propanediol or a mixture thereof), butylene glycol (1,2-, 1,3-, or 1,4-butylene glycol or a mixture thereof), 1,5-pentanediol, 1,6-hexanediol, neopentyl glycol, 2-methyl-1,3-propanediol, 2-butyl-2-ethyl-1,3-propanediol, 3-methyl-1,5-pentanediol, 2,2,2-trimethylpentanediol, and 3,3-dimethylolheptane; aliphatic diols such as ether diols including diethylene glycol, triethylene glycol, and dipropylene glycol; alicyclic diols such as cyclohexanediol (1,2-, 1,3-, or 1,4-cyclohexanediol or a mixture thereof), cyclohexanedimethanol (1,2-, 1,3-, or 1,4-cyclohexanedimethanol or a mixture thereof), cyclohexanediethanol (1,2-, 1,3-, or 1,4-cyclohexanediethanol or a mixture thereof), and hydrogenated bisphenol A; dihydric alcohols such as aromatic diols including bisphenol A, ethylene oxide adduct of bisphenol A, and propylene oxide adduct of bisphenol A; trihydric alcohols such as glycerin, trimethylolpropane, and triisopropanolamine; tetrahydric alcohols such as tetramethylolmethane (pentaerythritol) and diglycerin; pentahydric alcohols such as xylitol; and hexahydric alcohols such as sorbitol, mannitol, allitol, iditol, darcitol, altritol, inositol, and dipentaerythritol. A dihydric alcohol is preferable, an aliphatic diol is more preferable, alkanediol is further more preferable, and propylene glycol and neopentyl glycol are particularly preferable.

These polyhydric alcohols may be used alone or in combination of two or more.

The unsaturated polyester is obtained by polycondensation (condensation polymerization) of a polybasic acid with a polyhydric alcohol.

In order to subject the polybasic acid and the polyhydric alcohol to the polycondensation (condensation polymerization), the polybasic acid and the polyhydric alcohol are blended so as to have an equivalent ratio (hydroxyl group of the polyhydric alcohol/carboxyl group of the polybasic acid) of the polyhydric alcohol to the polybasic acid of, for example, 0.9 or more, preferably 0.95 or more, and, for example, 1.2 or less, preferably 1.1 or less. Then, the mixture is stirred under a normal pressure and a nitrogen atmosphere.

The reaction is carried out at a reaction temperature of, for example, 150° C. or more, preferably 190° C. or more, and, for example, 250° C. or less, preferably 230° C. or less.

The reaction is carried out for a reaction time of, for example, 8 hours or more, and, for example, 30 hours or less.

In the above-described reaction, as necessary, a known solvent and a known catalyst can be blended.

In this manner, unsaturated polyester is obtained.

The unsaturated polyester has an acid value (measurement method: in conformity with JIS K6901 (2008)) of, for example, 20 mgKOH/g or more, preferably 25 mgKOH/g or more, and, for example, less than 40 mgKOH/g, preferably 30 mgKOH/g or less.

The unsaturated polyester has a weight average molecular weight of, for example, 4000 or more, preferably 6000 or more, and, for example, 25000 or less, preferably 20000 or less.

The weight average molecular weight is a weight average molecular weight in terms of polystyrene by GPC (gel permeation chromatography), and can be determined by GPC measurement of the unsaturated polyester.

The vinyl ester is a reaction product of an epoxy resin and an unsaturated monobasic acid.

Examples of the epoxy resin include bisphenol epoxy resins and novolac epoxy resins. A bisphenol epoxy resin is preferable.

The bisphenol epoxy resin is represented by the following general formula (1).

phosphonium salts such as tetraphenylphosphonium bromide and ethyltriphenylphosphonium bromide; sulfonium salts; sulfonic acids; and organic metal salts such as zinc octylate. An ammonium salt is preferable, and triethylbenzylammonium chloride is more preferable.

These catalysts may be used alone or in combination of two or more.

A mixing ratio of the catalyst to 100 parts by mass of the epoxy resin is, for example, 0.1 parts by mass or more, and, for example, 3 parts by mass or less, preferably 1 part by mass or less.

In this manner, the epoxy resin is modified by the phenol compound.

As the epoxy resin, an epoxy resin modified by a phenol compound is preferable, and a bisphenol A epoxy resin modified by a bisphenol A is more preferable.

These epoxy resins may be used alone or in combination of two or more.

The epoxy resin has an epoxy equivalent of, for example, 100 mgKOH/g or more, preferably 250 mgKOH/g or more, and, for example, 500 mgKOH/g or less, preferably 350 mgKOH/g or less.

When two types of the epoxy resins are used in combination, the above-described epoxy equivalent is an epoxy equivalent of all the epoxy resins obtained by multiplying the epoxy equivalent of each of the epoxy resins by the mass ratio of each of the epoxy resins to the total amount of the epoxy resins and adding up the products of the epoxy equivalents and the mass ratios.

Examples of the unsaturated monobasic acid include monocarboxylic acids such as (meth)acrylic acid, crotonic

[Chem. 1]

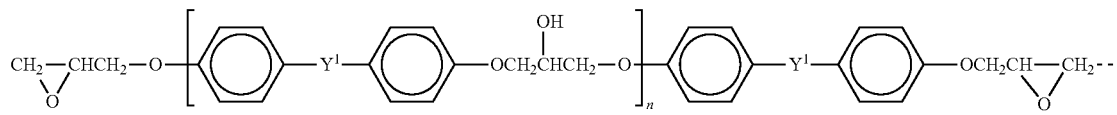

(1)

(In the formula, $Y^1$ represents one of —$C(CH_3)_2$—, —CH—$CH_2$—, —O—, —S—, and —(O=S=O)—, and n presents is an integer of 0 to 5.)

Examples of the bisphenol epoxy resin include bisphenol A epoxy resins, bisphenol F epoxy resins, and bisphenol S epoxy resins. A bisphenol A epoxy resin is preferable.

The epoxy resin can also be modified by, for example, a bisphenol A, bisphenol F, or bisphenol S phenol compound.

To modify the epoxy resin by a phenol compound, the epoxy resin is reacted with the phenol compound.

The mixing ratio of the phenol compound to one mole of the epoxy resin is, for example, 0.1 moles or more, preferably 0.2 moles or more, and, for example, 0.5 moles or less.

In the above-described reaction, the reaction temperature is, for example, 100° C. or more, preferably 130° C. or more, and, for example, 170° C. or less, and, the reaction time is, for example, 1 hour or more, preferably 2 hours or more, and, for example, 10 hours or less.

In the above-described reaction, as necessary, a catalyst can be blended.

Examples of the catalyst include amines such as triethylamine and benzyldimethylamine; ammonium salts such as tetramethylammonium chloride and triethylbenzylammonium chloride; imidazoles such as 2-ethyl-4-imidazole; amides; pyridines; phosphines such as triphenylphosphine;

acid, cinnamic acid, and sorbic acid; and a reaction product of a dibasic acid anhydride and an alcohol having at least one unsaturated group in the molecule. Used herein, the "(meth)acryl" refers to methacryl and/or acryl.

Examples of the dibasic acid anhydride include maleic anhydride, succinic anhydride, phthalic anhydride, tetrahydrophthalic anhydride, and hexahydrophthalic anhydride.

Examples of the alcohol having an unsaturated group include hydroxyethyl (meth)acrylate, hydroxypropyl (meth)acrylate, hydroxybutyl (meth)acrylate, pentaerythritol tri (meth)acrylate, and glycerin di(meth)acrylate.

These unsaturated monobasic acids may be used alone or in combination of two or more.

As the unsaturated monobasic acid, a monocarboxylic acid is preferable, a (meth)acrylic acid is more preferable, and a methacrylic acid is further more preferable.

To produce the vinyl ester, an epoxy resin is reacted with an unsaturated monobasic acid.

In the above-described reaction, an addition reaction of the epoxy group of the epoxy resin and the unsaturated monobasic acid occurs.

In the above-described reaction, an equivalent of the carboxyl group of the unsaturated monobasic acid with respect to the epoxy group of the epoxy resin is, for example, 0.8 or more, preferably 0.9 or more, and, for example, 1.5 or less, preferably 1.1 or less.

In the above-described reaction, the reaction temperature is, for example, 80° C. or more, preferably 100° C. or more, and, for example, 150° C. or less, preferably 130° C. or less, and the reaction time is, for example, 1 hour or more, preferably 2 hours or more, and, for example, 10 hours or less.

Further, in the above-described reaction, as necessary, the above-described catalyst (preferably ammonium salt, more preferably triethylbenzylammonium chloride) can be blended.

The mixing ratio of the catalyst to 100 parts by mass of the epoxy resin is, for example, 0.1 parts by mass or more, preferably 1 part by mass or more, and, for example, 5 parts by mass or less, preferably 3 parts by mass or less.

In the above-described reaction, as necessary, a polymerization inhibitor can be added.

Examples of the polymerization inhibitor include hydroquinone compounds such as hydroquinone, methyl hydroquinone, and t-butyl hydroquinone; benzoquinone compounds such as p-benzoquinone and methyl-p-benzoquinone; catechol compounds such as t-butyl catechol; phenol compounds such as 2,6-di-t-butyl-4-methyl phenol and 4-methoxy phenol; and N-oxyl compounds such as 1-oxyl-2,2,6,6-tetramethyl piperidine, 1-oxyl-2,2,6,6-tetramethyl piperidine-4-ol, 4-hydroxy-2,2,6,6-tetra piperidine-1-oxyl, 4-methoxy-2,2,6,6-tetramethyl piperidine-1-oxyl, 1-oxyl-2,2,6,6-tetramethyl piperidine-4-yl-acetate, 1-oxyl-2,2,6,6-tetramethyl piperidine-4-yl-2-ethyl hexanoate, 1-oxyl-2,2,6,6-tetramethyl piperidine-4-yl-stearate, 1-oxyl-2,2,6,6-tetramethyl piperidine-4-yl-4-t-butyl benzoate, bis(1-oxyl-2,2,6,6-tetramethyl piperidine-4-yl) succinic acid ester, bis(1-oxyl-2,2,6,6-tetramethyl piperidine-4-yl) adipic acid ester, bis(1-oxyl-2,2,6,6-tetramethyl piperidine-4-yl) sebacate, bis(1-oxyl-2,2,6,6-tetramethyl piperidine-4-yl) n-butyl malonic acid ester, bis(1-oxyl-2,2,6,6-tetramethyl piperidine-4-yl) phthalate, bis(1-oxyl-2,2,6,6-tetramethyl piperidine-4-yl) isophthalate, bis(1-oxyl-2,2,6,6-tetramethyl piperidine-4-yl) terephthalate, bis(1-oxyl-2,2,6,6-tetramethyl piperidine-4-yl) hexa hydro terephthalate, N,N'-bis(1-oxyl-2,2,6,6-tetramethyl piperidine-4-yl) adipamide, N-bis(1-oxyl-2,2,6,6-tetramethyl piperidine-4-yl) caprolactam, N-bis(1-oxyl-2,2,6,6-tetramethyl piperidine-4-yl) dodecyl succinimide, 2,4,6-tris-[N-butyl-N-(1-oxyl-2,2,6,6-tetramethyl piperidine-4-yl)]-s-triazine, 1-oxyl-2,2,6,6-tetramethyl piperidine-4-one. A hydroquinone compound is preferable, and hydroquinone is more preferable.

These polymerization inhibitors may be used alone or in combination of two or more.

The mixing ratio of the polymerization inhibitor to 100 parts by mass of the epoxy resin is, for example, 0.1 parts by mass or more, preferably 1 part by mass or more, and, for example, 5 parts by mass or less, preferably 3 parts by mass or less.

In this manner, vinyl ester is produced.

The vinyl ester has an acid value (measurement method: in conformity with JIS K6901 (2008)) of, for example, 1 mgKOH/g or more, preferably 5 mgKOH/g or more, and, for example, less than 20 mgKOH/g, preferably 10 mgKOH/g or less.

These double bond-containing curable polymers may be used alone or in combination of two or more.

The double bond-containing curable polymer has a double bond equivalent (number average molecular weight per double bond) of, for example, 150 g/eq. or more, preferably 200 g/eq. or more, and, for example, 450 g/eq. or less, preferably 350 g/eq. or less.

When the double bond equivalent of the double bond-containing curable polymer is the above-described lower limit or more, the molded article (described below) has excellent toughness and excellent strength (specific strength) even when the molded article has a small thickness.

When the double bond equivalent of the double bond-containing curable polymer is the above-described upper limit or less, the molded article (described below) has excellent heat resistance enough to prevent a crack during the demolding at a high temperature of the molding, and has excellent strength (specific strength) and modulus of elasticity (specific rigidity) even when the molded article has a small thickness.

The method of calculating the double bond equivalent is described in detail in Examples described below.

When two types of the double bond-containing curable polymers are used in combination, the above-described double bond equivalent is calculated based on the definitions of the double bond equivalent and mixing ratio of each double bond-containing curable polymer. More specifically, for example, suppose that polymers A and B have double bond equivalents eq A (g/eq.) and eq B (g/eq.), respectively. When the ratio of the parts by mass of the combined polymers is a:b, the combined polymer has a double bond equivalent calculated from the following formula (1).

$$[(a/(a+b)/\text{eq}A)+(b/(a+b)/\text{eq}B)]^{-1} \quad (1)$$

These double bond-containing curable polymers may be used alone or in combination of two or more.

When an unsaturated polyester and a vinyl ester are used in combination as the double bond-containing curable polymer, the mixing ratio of the unsaturated polyester to 100 parts by mass of the total amount of the unsaturated polyester and vinyl ester is, for example, 50 parts by mass or more, and, for example, 90 parts by mass or less. The mixing ratio of the vinyl ester to 100 parts by mass of the total amount of the unsaturated polyester and vinyl ester is, for example, 10 parts by mass or more, and, for example, 50 parts by mass or less.

The mixing ratio of the double bond-containing curable polymer is, for example, 30 parts by mass or more, and, for example, 60 parts by mass or less to 100 parts by mass of the total amount of the double bond-containing curable polymer, polymerizable monomer, and a low profile agent (described below) that is blended as necessary.

The polymerizable monomer is a solvent for dissolving the double bond-containing curable polymer, and is a cross-linkable monomer (reactive diluent) that is cross-linkable with the double bond-containing curable polymer at the time of curing of a double bond-containing curable resin (described later). Examples thereof include styrene-based monomers such as styrene, a-methyl styrene, a-ethyl styrene, vinyltoluene, t-butylstyrene, and chlorostyrene; (meth) acrylic acid ester-based monomers including alkyl (meth) acrylates such as methyl (meth)acrylate, ethyl (meth) acrylate, isopropyl (meth)acrylate, butyl (meth)acrylate, n-butyl (meth)acrylate, t-butyl (meth)acrylate, isobutyl (meth)acrylate, 2-ethylhexyl (meth)acrylate, lauryl (meth) acrylate, tridecyl (meth)acrylate, and stearyl (meth)acrylate, allyl (meth)acrylate esters such as allyl (meth)acrylate, cyclic structure-containing (meth)acrylates such as cyclohexyl (meth)acrylate, benzyl (meth)acrylate, isobornyl (meth)acrylate, glycidyl (meth)acrylate, tetrahydrofurfuryl (meth)acrylate, dicyclopentenyl (meth)acrylate, dicyclopentanyl (meth)acrylate, and dicyclopentenyloxyethyl (meth) acrylate, hydroxyl alkyl (meth)acrylates such as 2-hydroxyethyl (meth)acrylate and 2-hydroxypropyl (meth)acrylate, alkoxy alkyl (meth)acrylates such as 2-methoxyethyl (meth) acrylate and 2-ethoxyethyl (meth)acrylate, amino alkyl (meth)acrylates such as dimethyl amino ethyl (meth)acrylate and diethyl amino ethyl (meth)acrylate and chloride salts of these, and fluoroalkyl (meth)acrylates such as trifluoroethyl (meth)acrylate and heptadecafluorodecyl (meth)acrylate; polyfunctional (meth)acrylates such as ethylene glycol di(meth)acrylate, diethylene glycol di(meth)acrylate, trimethylolpropane tri(meth)acrylate, pentaerythritol tetra(meth) acrylate, and dipentaerythritol hexa(meth)acrylate; and allyl-based monomers such as glycerin monoallyl ether, pentaerythritol diallyl ether, pentaerythritol monoallyl ether, and trimethylolpropane monoallyl ether. A styrene-based monomer is preferable, and a styrene is more preferable.

These polymerizable monomers may be used alone or in combination of two or more.

A mixing ratio of the polymerizable monomer to 100 parts by mass of the double bond-containing curable polymer is, for example, 30 parts by mass or more, preferably 100 parts by mass or more, and, for example, 150 parts by mass or less.

A mixing ratio of the polymerizable monomer is, for example, 20 parts by mass or more, preferably 30 parts by mass or more, and, for example, 60 parts by mass or less to 100 parts by mass of the total amount of the double bond-containing curable polymer, polymerizable monomer, and the low profile agent (described below) that is blended as necessary.

The resin component preferably contains a low profile agent.

The low profile agent is blended in order to suppress curing shrinkage and thermal shrinkage of the molded article (described later) when the molded article (described later) is obtained by using the thin plate molding material.

Examples of the low profile agent include polyethylene, polystyrene, styrene thermoplastic elastomer, cross-linked polystyrene, polyvinyl acetate-polystyrene block copolymer, polyvinyl acetate, polymethylmethacrylate, and saturated polyester resin.

Examples of the styrene thermoplastic elastomer include styrene-butadiene block copolymer elastomers, styrene-isoprene block copolymer elastomers, styrene-ethylene/butylene block copolymer elastomers, styrene-ethylene/propylene block copolymer elastomers. A styrene-ethylene/propylene block copolymer elastomer is preferable. Example of commercial products of the styrene thermoplastic elastomers include D1101, D1102, D1155, DKX405, DKX410, DKX415, D1192, D1161, D1171, G1651, G1652, G1654, G1701, G1730 (manufactured by KRATON ENEOS ELASTOMERS K.K.), ASAPRENE T411, ASAPRENE T432, TUFPRENE A, TUFPRENE 125, TUFPRENE 126S, TUFPRENE 315, TUFPRENE 912, Tuftec H1141, Tuftec H1041, Tuftec H1043, Tuftec H1052 (manufactured by Asahi Kasei Corp.), and SEPTON 1001 and 1201 (manufactured by Kuraray Co., Ltd.).

The styrene content in the styrene thermoplastic elastomer is, for example, 5 mass % or more, and, for example, 50 mass % or less.

As the low profile agent, polyethylene, polystyrene, and polyvinyl acetate are preferable.

These low profile agents may be used alone or in combination of two or more.

The mixing ratio of the low profile agent to 100 parts by mass of the double bond-containing curable polymer is, for example, 5 parts by mass or more, preferably 20 parts by mass or more, and, for example, 50 parts by mass or less.

The mixing ratio of the low profile agent is, for example, 3 parts by mass or more, preferably 5 parts by mass or more, and, for example, 25 parts by mass or less, preferably 15 parts by mass or less to 100 parts by mass of the total amount of the double bond-containing curable polymer, polymerizable monomer, and the low profile agent.

The filling material preferably contains a filler (hereinafter, referred to as the first filler) having an average value of the maximum particle lengths of 15 μm or more and 300 μm or less.

When the filling material contains the first filler, the excellent moldability (thin plate moldability) in conformity with a mold for forming a thin plate is achieved. And the molded article (described below) has excellent specific strength and specific rigidity to provide the component with strength and rigidity even when the molded article has a small thickness.

When the filling material has an approximately spherical shape (specifically, glass balloons (hollow glass) (described below)), the average value of the maximum particle lengths means an average particle diameter $d_{50}$ that is obtained by creating a particle size distribution curve with a laser diffraction-scattering particle size distribution measurement device and calculating the particle diameter corresponding to 50 mass %. When the filling material has an acicular shape (specifically, milled carbon fibers (described below)), the average value of the maximum particle lengths means an average length-weighted fiber length Lw that is calculating from the following formula (2) by using a videoscope to obtain the fiber length distribution of an appropriate amount of the milled carbon fibers and using a frequency Ni and an average length Li of each histogram.

$$Lw = \Sigma(NiLi^2/NiLi) \quad (2)$$

Examples of the material of the first filler include inorganic filling materials such as oxides such as alumina and titania, hydroxides such as magnesium hydroxide and aluminum hydroxide, carbonates such as calcium carbonate, sulfates such as barium sulfate, silica (for example, crystalline silica, fused silica, fumed silica, dry silica (aerogel), and the like), glass powders, hollow fillers such as glass balloons (hollow glass), silica balloon, and alumina balloon; silicates such as silica sand, diatomaceous earth, mica, clay, kaolin, and talc, fluorides such as fluorite, phosphates such as calcium phosphate, and clay minerals such as smectite, and carbon fibers such as milled carbon fibers; and conductive fillers such as conducting particles and carbon nanotube. A hollow filler and a carbon fiber are preferable, and glass balloons (hollow glass), and milled carbon fibers are more preferable.

When the material of the first filler is glass balloons (hollow glass), an average value of the maximum lengths of the glass balloons (hollow glass) is, for example, 15 μm or more, for example, 300 μm or less, preferably 100 μm or less, more preferably 50 μm or less.

When the filling material contains glass balloons (hollow glass) with an average value of the maximum lengths of 15 μm or more and 50 μm or less, the density can be reduced without the reduction in the thin plate moldability. Thus, a molded article (described below) with excellent specific strength and specific rigidity can be molded.

When milled carbon fibers are used as the material of the first filler, an average value of the maximum lengths of the milled carbon fibers is, for example, 100 μm or more, and, for example, 300 μm or less.

When the filling material contains, as the first filler, the milled carbon fibers with an average value of the maximum lengths of 100 µm or more and 300 µm or less, the strength and the modulus of elasticity can be improved without an effect on the thin plate moldability and density. Thus, a molded article (described below) with excellent specific strength and specific rigidity can be molded.

The first fillers can be used singly or in combination of two or more. Preferably, the above-described glass balloons (hollow glass) and the above-described milled carbon fibers are contained.

When the first filler contains the above-described glass balloons (hollow glass) and the above-described milled carbon fibers, the mixing ratio of the above-described glass balloons (hollow glass) is, for example, 60 parts by mass or more, and, for example, 80 parts by mass or less to 100 parts by mass of the total amount of the above-described glass balloons (hollow glass) and the above-described milled carbon fibers. The mixing ratio of the above-described milled carbon fibers is, for example, 20 parts by mass or more, and, for example, 40 parts by mass or less to 100 parts by mass of the total amount of the above-described glass balloons (hollow glass) and the above-described milled carbon fibers.

The mixing ratio of the first filler to 100 parts by mass of the filling material is, for example, 5 parts by mass or more, preferably 20 parts by mass or more, more preferably 30 parts by mass or more, more preferably 40 parts by mass or more, and, for example, 60 parts by mass or less, preferably 50 parts by mass or less.

The mixing ratio of the first filler is, for example, 3 parts by mass or more, preferably 10 parts by mass or more, and, for example, 50 parts by mass or less, preferably 20 parts by mass or less to 100 parts by mass of the total amount of the double bond-containing curable polymer, the polymerizable monomer, and the low profile agent that is blended as necessary.

The filling material can contain a filler having an average value of the maximum particle lengths of less than 15 µm (hereinafter, referred to as the second filler).

Examples of the material of the second filler include the above-described materials of the first filler. Calcium carbonate is preferable.

These second fillers may be used alone or in combination of two or more.

The mixing ratio of the second filler to 100 parts by mass of the filling material is, for example, 40 parts by mass or more, preferably 50 parts by mass or more, and, for example, 95 parts by mass or less, preferably 80 parts by mass or less, more preferably 70 parts by mass or less, even more preferably 60 parts by mass or less.

The mixing ratio of the second filler is, for example, 10 parts by mass or more, preferably 20 parts by mass or more, and, for example, 150 parts by mass or less, preferably 100 parts by mass or less, more preferably 50 parts by mass or less to 100 parts by mass of the total amount of the double bond-containing curable polymer, the polymerizable monomer, and the low profile agent that is blended as necessary.

The filling material can contain a filler having an average value of the maximum particle lengths of more than 300 µm (hereinafter, referred to as the third filler).

Examples of the material of the third filler include the above-described materials of the first filler.

These third fillers may be used alone or in combination of two or more.

The mixing ratio of the third filler to 100 parts by mass of the filling material is, for example, 1 part by mass or more, preferably 10 parts by mass or more, and, for example, 100 parts by mass or less, preferably 50 parts by mass or less.

The mixing ratio of the third filler is, for example, 10 parts by mass or more, and, for example, 50 parts by mass or less to 100 parts by mass of the total amount of the double bond-containing curable polymer, the polymerizable monomer, and the low profile agent that is blended as necessary.

Preferably, the filling material does not contain the third filler, and contains the first filler and the second filler.

The mixing ratio of the filling material to 100 parts by mass of the double bond-containing curable polymer is, for example, 60 parts by mass or more, preferably 80 parts by mass or more, and, for example, 400 parts by mass or less, preferably 200 parts by mass or less.

The mixing ratio of the filling material is, for example, 30 parts by mass or more, preferably 40 parts by mass or more, and, for example, 150 parts by mass or less, preferably 100 parts by mass or less, 60 parts by mass or less, more preferably 50 parts by mass or less to 100 parts by mass of the total amount of the double bond-containing curable polymer, the polymerizable monomer, and the low profile agent that is blended as necessary.

Further, if necessary, the resin component contains an additive such as a polymerization inhibitor, a curing catalyst, a silane coupling agent, a wetting and dispersing agent, a release agent, a thickener, a coloring agent, or a flame retardant. These additives may be used alone or in combination of two or more.

Examples of the polymerization inhibitor include the above-described polymerization inhibitors. P-benzoquinone is preferable.

The mixing ratio of the polymerization inhibitor is, for example, 0.01 parts by mass or more, and, for example, 5 parts by mass or less, preferably 1 part by mass or less to 100 parts by mass of the total amount of the double bond-containing curable polymer, the polymerizable monomer, and the low profile agent that is blended as necessary.

Examples of the curing catalyst include peroxides such as benzoyl peroxide, t-butyl peroxyisopropyl monocarbonate, t-amyl peroxyisopropyl carbonate, t-hexyl peroxyisopropyl monocarbonate, 1,1-bis(t-butyl peroxy)cyclohexane, t-butyl peroxy-2-ethylhexanoate, amylperoxy-2-ethylhexanoate, 2-ethylhexylperoxy-2-ethylhexanoate, t-butyl peroxybenzoate, t-hexyl peroxybenzoate, and t-hexyl peroxyacetate. T-butyl peroxyisopropyl monocarbonate which is peroxyisopropyl monocarbonate, t-amyl peroxyisopropyl monocarbonate, t-hexyl peroxyisopropyl monocarbonate, and t-butyl peroxybenzoate are preferable. T-butyl peroxyisopropyl carbonate is preferable.

The mixing ratio of the curing catalyst is, for example, 0.5 parts by mass or more, preferably 1 part by mass or more, and, for example, 10 parts by mass or less, preferably 3 parts by mass or less to 100 parts by mass of the total amount of the double bond-containing curable polymer, the polymerizable monomer, and the low profile agent that is blended as necessary.

These curing catalysts may be used alone or in combination of two or more.

The silane coupling agent is blended to increase the mechanical strength and water resistance of the molded article (described below). Examples of the coupling agent include silane coupling agents with a vinyl group such as vinyl trichlorosilane and vinyl triethoxysilane, silane coupling agents with an epoxy group such as 3-glycidoxypropyltrimethoxysilane and 2-(3,4-epoxycyclohexyl)ethyltrimethoxysilane, silane coupling agents with an amino group such as 3-aminopropyltrimethoxysilane and N-2-(aminoethyl)-3-aminopropyltriethoxysilane, silane coupling agents with a (meth)acryloyl group such as 3-methacryloxypropyltrimethoxysilane and 3-methacryloxypropylmethyldimethoxysilane, and titanate-based coupling agents. A silane coupling agent with a (meth)acryloyl group is preferable. 3-methacryloxypropyltrimethoxysilane is more preferable.

These silane coupling agents may be used alone or in combination of two or more.

The mixing ratio of the silane coupling agent is, for example, 0.1 parts by mass or more, preferably 0.5 parts by mass or more, and, for example, 5 parts by mass or less, preferably 1 part by mass or less to 100 parts by mass of the total amount of the double bond-containing curable polymer, the polymerizable monomer, and the low profile agent that is blended as necessary.

These silane coupling agents may be used alone or in combination of two or more.

A wetting and dispersing agent is blended so as to reduce the viscosity of the resin composition to a suitable value for heat compression molding. A known wetting and dispersing agent such as phosphoric acid polyester is used. For the wetting and dispersing agent, a commercially available product can be used, and to be specific, BYK-W996 (manufactured by BYK-Chemie) is used.

The mixing ratio of the wetting and dispersing agent is, for example, 0.1 parts by mass or more, preferably 0.5 parts by mass or more, and, for example, 10 parts by mass or less, preferably 3 parts by mass or less to 100 parts by mass of the total amount of the double bond-containing curable polymer, the polymerizable monomer, and the low profile agent that is blended as necessary.

These wetting and dispersing agents may be used alone or in combination of two or more.

Examples of the release agent include fatty acids such as stearic acid and lauric acid, fatty acid metal salts such as zinc stearate and calcium stearate, paraffins, liquid waxes, fluorine polymers, and silicon-based polymers. Fatty acid metal salt is preferable, and zinc stearate is more preferable.

The mixing ratio of the release agent is, for example, 1 part by mass or more, preferably 3 parts by mass or more, and, for example, 10 parts by mass or less to 100 parts by mass of the total amount of the double bond-containing curable polymer, the polymerizable monomer, and the low profile agent that is blended as necessary.

These release agents may be used alone or in combination of two or more.

The thickener is blended so as to increase the viscosity of the resin composition to a suitable value for heat compression molding, and is preferably blended before (preferably, immediately before) impregnating the reinforcing fiber (described later) with the resin composition. Examples thereof include alkaline earth metal oxides such as magnesium oxide, alkaline earth metal hydroxides such as magnesium hydroxide and calcium hydroxide, and polyisocyanate compounds such as diphenylmethane diisocyanate (MDI). An alkaline earth metal oxide is preferable, and magnesium oxide is more preferable.

The mixing ratio of the thickener is, for example, 0.1 parts by mass or more, preferably 0.5 parts by mass or more, and, for example, 5 parts by mass or less, preferably 3 parts by mass or less to 100 parts by mass of the total amount of the double bond-containing curable polymer, the polymerizable monomer, and the low profile agent that is blended as necessary.

These thickeners may be used alone or in combination of two or more.

Examples of the coloring agent include, without particular limitation, for example, titanium oxide and polyester toner (titanium oxide and/or carbon black-containing polyester coloring agent).

The mixing ratio of the coloring agent is, for example, 1 part by mass or more, preferably 5 parts by mass or more, and, for example, 20 parts by mass or less to 100 parts by mass of the total amount of the double bond-containing curable polymer, the polymerizable monomer, and the low profile agent that is blended as necessary.

These coloring agents may be used alone or in combination of two or more.

Examples of the flame retardant include halogen flame retardants such as a bromine-based flame retardant, and non-halogen flame retardants such as a phosphorus-based flame retardant, an inorganic flame retardant, and a nitrogen compound-based flame retardant.

The mixing ratio of the flame retardant is, for example, 1 part by mass or more, preferably 5 parts by mass or more, and, for example, 50 parts by mass or less, preferably 20 parts by mass or less to 100 parts by mass of the total amount of the double bond-containing curable polymer, the polymerizable monomer, and the low profile agent that is blended as necessary.

These flame retardants may be used alone or in combination of two or more.

Further, if necessary, an additive may be blended into the resin component as long as it does not damage the effects of the present invention. Examples of the additive include pattern materials, antibacterial agents, hydrophilic agents, photocatalysts, ultraviolet absorbers, ultraviolet stabilizers, separation inhibitors, antistatic agents, thixotropic agents, thixo stabilizers, and polymerization accelerators. These additives may be used alone or in combination of two or more.

The resin composition can be obtained by mixing the components of the resin component (specifically, the double bond-containing curable polymer, the polymerizable monomer, the low profile agent that is blended as necessary, and a variety of additives that are blended as necessary) with the filling material in the above-described mixing ratios.

In this manner, the resin composition is produced.

In the resin composition, the mixing ratio of the double bond-containing curable polymer to the resin composition is, for example, 10 mass % or more, preferably 20 mass % or more, and, for example, 40 mass % or less, preferably 30 mass % or less.

The mixing ratio of the polymerizable monomer to the resin composition is, for example, 15 mass % or more, preferably 25 mass % or more, and, for example, 55 mass % or less.

The mixing ratio of the low profile agent to the resin composition is, for example, 3 mass % or more, preferably 5 mass % or more, and, for example, 15 mass % or less, preferably 10 mass % or less.

The mixing ratio of the resin component to the resin composition is, for example, 40 mass % or more, preferably 50 mass % or more, and, for example, 80 mass % or less, preferably 70 mass % or less.

The mixing ratio of the filling material to the resin composition is, for example, 10 mass % or more, preferably 20 mass % or more, and, for example, 70 mass % or less, preferably 50 mass % or less.

As described above, the resin composition is obtained by mixing the double bond-containing curable polymer and the polymerizable monomer, and, as necessary, the low profile agent and additive. However, the double bond-containing curable polymer is first dissolved in the polymerizable monomer to prepare a double bond-containing curable resin. Thereafter, the prepared double bond-containing curable resin, the polymerizable monomer, and, as necessary, the low profile agent and the additive can be mixed with the filling material.

In the preparation of the double bond-containing curable polymer, the above-described additives can appropriately be mixed as necessary in addition to the mixing of the double bond-containing curable polymer and the polymerizable monomer.

In the preparation of the double bond-containing curable polymer, the mixing ratio of the polymerizable monomer to 100 parts by mass of the double bond-containing curable polymer is, for example, 35 parts by mass or more, and, for example, 150 parts by mass or less.

Examples of the reinforced fiber include inorganic fibers such as glass fiber, carbon fiber, metal fiber, and ceramics fiber; organic fibers such as poly vinyl alcohol fiber, polyester fiber, polyamide fiber, fluorine resin fiber, and phenol fiber; and natural fibers such as hemp and Kenaf. Inorganic fiber is preferable, carbon fiber and glass fiber are more preferable, and glass fiber is even more preferable.

These examples of the reinforced fiber can be in the form of, for example, cloth such as roving cloth; mat such as chopped strand mat, preformable mat, continuous strand mat, and surfacing mat; strand such as chopped strand; roved; nonwoven fabric; or paper. A roving form is preferable.

Among the reinforced fibers, glass roving is preferable.

The reinforced fiber has a fiber length of 10 mm or more, preferably 20 mm or more, and, 60 mm or less, preferably 30 mm or less.

When the fiber length of the reinforced fiber is the above-described lower limit or more, the molded article has excellent strength and modulus of elasticity. Thus, the molded article (described below) has excellent strength and rigidity even when the molded article has a small thickness.

Meanwhile, when the fiber length of the reinforced fiber is less than the above-described lower limit, the mechanical properties of the material are drastically reduced. Thus, when the molded article (described below) is thin, sufficient strength and rigidity cannot be obtained. Further, in view of the moldability, the amount of leakage (the amount of burr) from the mold increases, and the burr adhering to the mold causes a crack at the demolding.

When the fiber length of the reinforced fiber is the above-described upper limit or less, the mutual interference of the reinforced fiber is lessened. Consequently, the homogeneous dispersion of the flowing resin composition and fibers is maintained even in the molding of a thin plate.

When the fiber length of the reinforced fiber is more than the above-described upper limit, the resin composition is separated from the fibers in the flow during the molding of a thin plate. Consequently, the uneven distribution of the fibers causes a warp or poor filling.

The fiber length is determined by the cutter pitch of the rotary cutter that continuously cuts the fibers in a common method for producing a sheet molding compound.

The reinforced fiber has an aspect ratio (a value of the length of the reinforced fiber divided by the diameter of a single fiber) is, for example, 100 or more, preferably 200 or more, more preferably 500 or more, and, for example, 1000 or less.

When the aspect ratio of the reinforced fiber is the above-described lower limit or more, a high reinforcing effect of the reinforced fiber is obtained and provides the molded article with excellent mechanical properties.

When the aspect ratio of the reinforced fiber is the above-described upper limit or less, the rigidity of each reinforced fiber is maintained and a shape curve of the fiber does not occur during the flow in the molding of a thin plate. Consequently, excellent mechanical properties of the molded article are achieved.

The thin plate molding material is obtained by mixing the reinforced fiber with the resin composition.

Specifically, the thin plate molding material is obtained, for example, as a sheet-shaped thin plate molding material by impregnating the reinforced fiber with the resin composition.

To prepare the thin plate molding material, a known method is used. Example thereof include SMC (sheet molding compound), TMC (thick molding compound), and BMC (bulk molding compound). SMC is preferable.

The content ratio of the reinforced fiber to the thin plate molding material is 21 vol % or more, preferably 23 vol % or more, and, 28 vol % or less.

The mass ratio of the reinforced fiber content to the thin plate molding material is, for example, 30 mass % or more, preferably 40 mass % or more, more preferably 45 mass % or more, and, for example, 50 mass % or less.

In this manner, the thin plate molding material containing the resin composition and the reinforced fiber is produced.

In the thin plate molding material, the mixing ratio of the resin component (in other words, the total amount of the double bond-containing curable polymer, the polymerizable monomer, the low profile agent that is blended as necessary, and the additive that is also blended as necessary) is 49 vol % or more and 56 vol % or less.

In other words, in the thin plate molding material, the content ratio of the reinforced fiber is the above-described predetermined ratio and the mixing ratio of the resin component is the above-described predetermined ratio.

When the content ratio of the reinforced fiber is the above-described predetermined ratio and the mixing ratio of the resin component is the above-described predetermined ratio, the thin plate molding material has good fluidity and has excellent moldability (thin plate moldability) in conformity with a mold for producing a thin plate. This allows for the molding of a molded article with excellent specific strength and specific rigidity to provide the component with strength and rigidity even when the molded article is a thin plate. In this manner, the weight reduction of the molded article can be achieved.

When the mixing ratio of the resin component is the above-described predetermined ratio but the content ratio of the reinforced fiber is less than the above-described lower limit, the strength (specific strength) and rigidity (specific rigidity) of the molded article become insufficient when the molded article is molded into a thin plate. Further, the strength of the molded article becomes insufficient at the demolding at a high temperature, and this tends to cause a crack at the demolding.

When the mixing ratio of the resin component is the above-described predetermined ratio but the content ratio of the reinforced fiber is more than the above-described upper limit, the fluidity of the thin plate molding material as a whole becomes insufficient to form the molded article into a thin plate. Then, the reinforced fiber does not reach a part of an end of the molded article and this causes a resin-rich zone and a crack at the demolding.

When the content ratio of the reinforced fiber is the above-described predetermined ratio but the mixing ratio of the resin component is less than the above-described lower limit, the fluidity of the thin plate molding material becomes insufficient to form the molded article (described below) into a thin plate and causes a short shot in a part of the component.

When the content ratio of the reinforced fiber is the above-described predetermined ratio but the mixing ratio of the resin component is more than the above-described upper limit, the thin plate molding material apparently has a good fluidity but the burr caused by the flow of the resin composition from an end of the molded article increases and the reinforced fiber is sharply oriented at the end in the formation of the molded article into a thin plate. This tends to cause a crack at the demolding.

Next, to increase the viscosity of the thin plate molding material as described above for heat compression molding (described below), the thin plate molding material is preferably aged, for example, at 20° C. or more and 50° C. or less for 8 hours or more and 120 hours or less.

In this manner, the thin plate molding material is maintained in the form of, for example, a sheet. In other words, the thin plate molding material has a sheet shape.

The thin plate molding material as described above contains a resin composition containing a resin component and a filling material and reinforced fibers with a predetermined fiber length. The content ratio of the reinforced fiber is a predetermined ratio, and the mixing ratio of the resin component is a predetermined ratio.

Thus, the thin plate molding material has excellent thin plate moldability, and can be molded into a molded article with excellent strength and rigidity.

The molded article is obtained by subjecting the above-described thin plate molding material to heat compression molding by a known method.

The conditions for the heat compression molding are appropriately set depending on the use and purpose. Specifically, the molding temperature is, for example, 100° C. or more, preferably 120° C. or more, and, for example, 200° C. or less, preferably 160° C. or less. The molding pressure is, for example, 1 MPa or more, preferably 3 MPa or more, more preferably 5 MPa or more, and, for example, 30 MPa or less, preferably 15 MPa or less.

In this manner, the thin plate molding material is cured and molded.

In this manner, a molded article including a cured product of the thin plate molding material is produced.

The molded article has a thickness of, for example, 1.5 mm or less, preferably 1.3 mm or less, and, for example, 0.8 mm or more.

When the thickness of the molded article is the above-described upper limit or less, weight reduction can be achieved.

The molded article includes a cured product of the above-described thin plate molding material. Thus, even when the molded article is thin (the molded article has a thickness of, for example, 1.5 mm or less), the molded article is a weight-reduced component with excellent strength (specific strength) and rigidity (specific rigidity).

In detail, the specific strength and specific rigidity, which are mechanical properties (strength and modulus of elasticity) in consideration of density, are recognized as the properties of the material to achieve weight reduction. For the weight reduction of a car by resinification, the specific strength at 80° C. is calculated from the flexural strength (in conformity to JIS K 7074 (1988)), flexural modulus of elasticity (in conformity to JIS K 7074 (1988)), and density of the molded article in an environment at 80° C. in consideration of the decrease in the properties of the resin during heating. The specific strength at 80° C. is, for example, 130 MPa/(g/cm$^3$) or more, preferably 140 MPa/(g/cm$^3$) or more, more preferably 150 MPa/(g/cm$^3$) or more.

Similarly, the specific rigidity of the molded article at 80° C. is, for example, 13 (MPa)$^{1/3}$/(g/cm$^3$) or more, preferably 14.5 (MPa)$^{1/3}$/(g/cm$^3$) or more, more preferably 16.0 (MPa)$^{1/3}$/(g/cm$^3$) or more.

The methods of measuring the specific strength and specific rigidity are described in detail in Examples described below.

To achieve the above-described excellent specific strength and specific rigidity, the molded article has a density of, for example, 0.8 g/mL or more, preferably 1.2 g/mL or more, more preferably 1.5 g/mL or more, and, for example, 2.3 g/mL or less, preferably 1.8 g/mL or less.

The method of measuring the density is described in detail in Examples described below.

The molded article as described above can widely be used for various components for building materials, housings, casting materials, machine components, electronic or electric components, vehicles, ships, and aircrafts.

In particular, even if the molded article as described above is thin (the molded article has a thickness of, for example, 1.5 mm or less), the molded article has excellent strength (specific strength) and rigidity (specific rigidity) while achieving weight reduction. Therefore, the molded article can suitably be used for car components having a relatively complex shape such as door stiffeners.

EXAMPLE

The specific numeral values used in the description below, such as mixing ratios (contents), physical property values, and parameters can be replaced with the corresponding mixing ratios (contents), physical property values, and parameters in the above-described "DESCRIPTION OF THE EMBODIMENT", including the upper limit values (numeral values defined with "or less", and "less than") or the lower limit values (numeral values defined with "or more", and "more than"). The "parts" and "%" are based on mass unless otherwise specified.

1. Details of Components

Heavy calcium carbonate: the second filler, an average particle diameter $d_{50}$ of 5 μm Glass balloons: the first filler, an average particle diameter $d_{50}$ of 25 μm Milled carbon fiber: the first filler, an average length-weighted fiber length of 200 μm Glass fiber 1: glass roving with a single fiber diameter of 12 to 14 μm cut into pieces with a fiber length of 25.4 mm, an aspect ratio of approximately 2100 to 1800

Glass fiber 2; glass roving with a single fiber diameter of 12 to 14 μm cut into pieces with a fiber length of 6.4 mm, an aspect ratio of approximately 530 to 460

Carbon fiber: regular tow carbon fiber with a single fiber diameter of 5 to 7 μm cut into pieces with a fiber length of 25.4 mm, an aspect ratio of approximately 5080 to 3600, trade name "T700SC-12000", manufactured by Toray Industries, Inc.

2. Preparation of Unsaturated Polyester Resin

Synthesis Example 1

A flask equipped with a thermometer, a nitrogen introducing tube, a reflux tube, and a stirrer was charged with 3.3 mol of isophthalic acid and 10.5 mol of propylene glycol.

The mixture was subjected to polycondensation reaction at 200° C. to 210° C. while being stirred under nitrogen gas atmosphere. Thereafter, at the time when the reaction product had an acid value of 20 mgKOH/g, the reaction product was cooled to 150° C., charged with 6.7 mol of maleic anhydride, and subjected to the reaction at 200° C. to 210° C. again, thereby producing an unsaturated polyester with an acid value of 27.5 mgKOH/g and a double bond equivalent of 263 g/eq. The acid value was measured by a method in conformity to JIS K 6901 (2008). To 100 parts by mass of the produced unsaturated polyester, 0.01 parts by mass of hydroquinone as a polymerization inhibitor and 66.7 parts by mass of styrene were added and the mixture was stirred homogenously, thereby producing a 40% styrene-content unsaturated polyester resin.

Synthesis Example 2

A flask equipped with a thermometer, a nitrogen introducing tube, a reflux tube, and a stirrer was charged with 10.0 mol of maleic anhydride, 6.5 mol of propylene glycol, and 4.0 mol of neopentyl glycol. The mixture was subjected to polycondensation reaction at 200° C. to 210° C. while being stirred under nitrogen gas atmosphere, thereby producing an unsaturated polyester with an acid value of 26.5 mgKOH/g and a double bond equivalent of 171 g/eq. To 100 parts by mass of the produced unsaturated polyester, 0.01 parts by mass of hydroquinone as a polymerization inhibitor and 66.7 parts by mass of styrene were added, and the mixture was stirred homogenously, thereby producing a 40% styrene-content unsaturated polyester resin.

Synthesis Example 3

A flask equipped with a thermometer, a nitrogen introducing tube, a reflux tube, and a stirrer was charged with 5.0 mol of isophthalic acid, 6.5 mol of propylene glycol, and 4.0 mol of neopentyl glycol. The mixture was subjected to polycondensation reaction at 200° C. to 210° C. while being stirred under nitrogen gas atmosphere. Thereafter, at the time when the reaction product had an acid value of 20 mgKOH/g, the reaction product was cooled to 150° C., charged with 5.0 mol of maleic anhydride, and subjected to the reaction at 200° C. to 210° C. again, thereby producing an unsaturated polyester with an acid value of 27.0 mgKOH/g and a double bond equivalent of 392 g/eq. To 100 parts by mass of the produced unsaturated polyester, 0.01 parts by mass of hydroquinone as a polymerization inhibitor and 66.7 parts by mass of styrene were added and the mixture was stirred homogenously, thereby producing a 40% styrene-content unsaturated polyester resin.

3. Preparation of Vinyl Ester Resin

Synthesis Example 4

A reaction container (flask) equipped with a stirrer, a reflux tube, and a gas introducing tube was charged with 1850 parts by mass of a bisphenol A epoxy resin (epoxy equivalent of 185 g/eq) (10.0 equivalent), 317 parts by mass of bisphenol A (2.78 equivalent), and 0.5 parts by mass of triethylbenzylammonium chloride as a catalyst. The mixture was allowed to react at 150° C. for 5 hours while nitrogen was introduced, thereby producing an epoxy resin with an epoxy equivalent of 298. After the mixture was cooled to 120° C., 2.0 parts by mass of hydroquinone as a polymerization inhibitor, 2.0 parts by mass of triethylbenzylammonium chloride as a catalyst, and 636 parts by mass of methacrylic acid (7.40 equivalent) were added. The mixture was allowed to react at 110° C. for 8 hours while the air was introduced, thereby producing a vinyl ester with an acid value of 8.0 mgKOH/g and a double bond equivalent of 379 g/eq. Next, 1869 parts by mass of styrene was added to the produced vinyl ester, thereby producing a vinyl ester resin with a styrene content of 40% by mass.

4. Production of Thin Plate Molding Material

Examples 1 to 13 and Comparative Examples 1 to 6

(Preparation of Thin Plate Molding Material)

According to each formulation of Tables 1 and 2, the components other than the thickener were homogenously mixed, thereby producing a resin composition. Then the thickener was added to the produced resin composition (paste). The mixture was stirred for 3 minutes and supplied in an SMC impregnation machine (manufactured by Tsukishima Kikai Co., Ltd.) immediately after the stirring, and reinforced fibers were added and sufficiently impregnated therewith. Thereafter, the mixture was aged for 48 hours, thereby producing a sheet-shaped thin plate molding material with a thickness of 2 mm.

As described in Synthesis Examples, 60 parts by mass of the double bond-containing curable polymer and 40 parts by mass of the polymerizable monomer were mixed in advance and used for the preparation, and 40 parts by mass of polyvinyl acetate and polystyrene and 60 parts by mass of the polymerizable monomer were mixed in advance and used for the preparation.

(Preparation of Molded Article for Measurement of Mold Shrinkage Rate, Density, and Bending Property at 80° C.)

Thin plate molding materials with a length of 140 mm×a width of 140 mm were cut out from the above-described thin plate molding material. Three of the thin plate molding materials were laminated. A 100-ton press for FRP molding and a mold with a positive draft for SMC molding, which had a cavity having a flat plate shape with a length of 300 mm×a width of 300 mm and was heated to 140° C., were used to heat and press the laminate of the thin plate molding materials, which is placed at the center of the flat plate, under a molding pressure of 10 MPa for 5 minutes.

In this manner, a 300-mm square molded article with a thickness of 1.3 mm was produced.

5. Evaluations (Double Bond Equivalent)

The double bond equivalent of the unsaturated polyester of each of Synthesis Examples 1 to 3 was obtained by dividing the amount of the unsaturated polyester (a value obtain by subtracting the amount of dehydration from the sum of <the molecular weight of the polybasic acid×the number of moles> and <the molecular weight of the polyhydric alcohol×the number of moles>) by the number of moles of the ethylenically unsaturated bond-containing polybasic acid.

The double bond equivalent of the vinyl ester of Synthesis Example 4 was calculated as a value obtained by dividing the total amount of the main raw materials used for the synthesis by the number of moles of the methacrylic acid.

The results are shown in Tables 3 and 4.

(Density)

The density of the molded article (a thickness of 1.3 mm) of each of Examples and Comparative Examples was obtained according to Archimedes' principle using water at 25° C. The results are shown in Tables 3 and 4.

(Mold Shrinkage Rate)

The mold shrinkage rate of the molded article (a thickness of 1.3 mm) of each of Examples and Comparative Examples was obtained in conformity to JIS K 6911 (1995) except that the dimensions of the mold used for the molding and molded article were used. The results are shown in Tables 3 and 4.

(Flexural Strength and Flexural Modulus of Elasticity)

A rectangular test piece was cut out from the molded article (a thickness of 1.3 mm) of each of Examples and Comparative Examples by machine processing. A flexural test was carried out at 80° C. in conformity to JIS K 7017 (1999) A method class II (while the plate thickness was 1.3 mm) to measure the flexural strength and flexural modulus of elasticity of the test piece. The results are shown in Tables 3 and 4.

(Specific Strength)

The specific strength at 80° C. of the molded article (a thickness of 1.3 mm) of each of Examples and Comparative Examples was calculated according to the measurement results of the flexural strength at 80° C. and the density, and using the following formula (3).

$$\text{Specific strength at } 80° \text{ C.} = (\text{Flexural Strength at } 80° \text{ C.})/(\text{Density}) \quad (3)$$

The specific strength at 80° C. was evaluated by the following criteria. The results are shown in Tables 3 and 4.

Excellent: The specific strength at 80° C. was 150 MPa/(g/cm$^3$) or more.

Good: The specific strength at 80° C. was 140 MPa/(g/cm$^3$) or more and less than 150 MPa/(g/cm$^3$).

Fair: The specific strength at 80° C. was 130 MPa/(g/cm$^3$) or more and less than 140 MPa/(g/cm$^3$).

Bad: The specific strength at 80° C. was less than 130 MPa/(g/cm$^3$).

(Specific Rigidity)

The specific rigidity at 80° C. of the molded article (a thickness of 1.3 mm) of each of Examples and Comparative Examples was calculated according to the measurement results of the flexural modulus of elasticity at 80° C. and the density, and using the following formula (4).

$$\text{Specific Rigidity} = (\text{Flexural Modulus of Elasticity})^{1/3}/(\text{Density}) \quad (4)$$

The specific rigidity at 80° C. was evaluated by the following criteria. The results are shown in Tables 3 and 4.

Excellent: The specific rigidity at 80° C. was 16.0 (MPa)$^{1/3}$/(g/cm$^3$) or more.

Good: The specific rigidity at 80° C. was 14.5 (MPa)$^{1/3}$/(g/cm$^3$) or more and less than 16.0 (MPa)$^{1/3}$/(g/cm$^3$).

Fair: The specific rigidity at 80° C. was 13.0 (MPa)$^{1/3}$/(g/cm$^3$) or more and less than 14.5 (MPa)$^{1/3}$/(g/cm$^3$).

Bad: The specific rigidity at 80° C. was less than 13.0 (MPa)$^{1/3}$/(g/cm$^3$).

(Thin Plate Moldability)

The thin plate moldability was evaluated using a mold having a 300×600 mm plat surface surrounded by upright surfaces, according to the amount of leakage from the periphery of the mold during the molding (the amount of burr), the molding filling state in the whole of the mold cavity, and the crack at the demolding. The equipment used for the evaluation and the molding conditions were as follows.

Mold: Steam heatable mold with a positive draft for SMC molding having a 300×600 mm rectangular plat surface surrounded by upright surfaces with a thickness of 2 mm and a height of 25 mm and having a share edge with a clearance of 100 to 200 μm and traveling 20 mm Press: 500-ton FRP molding press manufactured by Kawasaki Hydromechanics Corp.

Conditions for molding a molded article with a thickness of 1.3 mm for the evaluation of the thin plate moldability: At a mold cavity temperature of 145° C. and a mold core temperature of 135° C., a laminate of two 200×400 mm pieces cut out from the thin plate molding material was placed at the center of the 300×600 mm flat surface of the mold, and the laminate was heated and pressed under the conditions of a pressing speed of 0.5 mm/sec and a press output of 180 tons (a molding pressure of approximately 10 MPa) for three minutes.

Conditions for molding a molded article with a thickness of 2.2 mm for the evaluation of the thin plate moldability: The molding was carried out under the same conditions as those of the evaluation of the molded article with a thickness of 1.3 mm except that a laminate of three 200×400 mm pieces cut out from the thin plate molding material was placed at the center of the 300×600 mm flat surface of the mold.

<Amount of Burr>

The amount (volume) of burr was measured when each of the molded article (a thickness of 1.3 mm) and the molded article (a thickness of 2.2 mm) was molded in each of Examples and Comparative Examples.

Specifically, the burr at the share edge of the molded article of each of Examples and Comparative Examples was cut off with a knife. The amount (volume) of the cut burr was calculated according to its weight and the density of each of Examples and Comparative Examples.

The amount of burr was evaluated by the following criteria. The results are shown in Tables 3 and 4.

Good: The amount of burr was less than 3.6 cm$^3$.

Fair: The amount of burr was 3.6 cm$^3$ or more and less than 7.2 cm$^3$.

Bad: The amount of burr was 7.2 cm$^3$ or more.

<Molding Filling State>

The molding filling state of each of the molded article (a thickness of 1.3 mm) and the molded article (a thickness of 2.2 mm) of Examples and Comparative Examples was visually observed.

The molding filling state was evaluated by the following criteria. The results are shown in Tables 3 and 4.

Good: The molded article was filled with all the components of the thin plate molding material to the edge of the molded article.

Resin rich: An unfilled part was not observed but a part containing only the resin composition and no reinforced fiber or a part containing an extremely small amount of the reinforced fiber was observed.

Short circuit: A part (unfilled part) containing neither resin composition nor reinforced fiber was observed.

<Number of Cracks at Demolding>

When each of the molded article (a thickness of 1.3 mm) and the molded article (a thickness of 2.2 mm) of each of Examples and Comparative Examples was demolded to check the molding filling state, the occurrence of a crack was observed. Ten molded articles were produced and the number of the articles that were cracked at the demolding was counted.

The number of cracks at the demolding was evaluated by the following criteria. The results are shown in Tables 3 and 4.

Good: The number of cracked molded articles was 0 or more and 1 or less.

Fair: The number of cracked molded articles was 2 or more and 4 or less.

Bad: The number of cracked molded articles was 5 or more.

6. Consideration

In Examples 1 to 13, the content ratio of the reinforced fiber was 21 vol % or more and 28 vol % or less and the mixing ratio of the resin component was 49 vol % or more and 56 vol % or less.

In Comparative Example 1, the content ratio of the reinforced fiber was less than 21 vol %.

In Comparative Example 2, the content ratio of the reinforced fiber was more than 28 vol %.

In Comparative Example 3, the mixing ratio of the resin component was less than 49 vol %.

In Comparative Example 4, the mixing ratio of the resin component was more than 56 vol %.

In Comparative Example 6, the content ratio of the reinforced fiber was less than 21 vol % and the mixing ratio of the resin component was less than 49 vol %.

Examples 1 to 13 demonstrate excellent thin plate moldability to produce a molded article having a large thickness (specifically, a thickness of 2.2 mm) and a complex shape as used for the evaluation of the thin plate moldability. Examples 1 to 13 also demonstrate excellent thin plate moldability to produce a molded article having a small thickness (specifically, a thickness of 1.3 mm).

On the other hand, Comparative Examples 1 to 4 and 6 show that the reduction in the thin plate moldability to produce a molded article having a small thickness and a complex shape as used for the evaluation of the thin plate moldability. Accordingly, it is proven that Comparative Examples 1 to 4 and 6 are inadequate to stabilize the molding in mass production of molded articles having a more complex shape than that of the molded article used for the evaluation (an actual component often has a part more difficult to fill than originally designed).

Accordingly, it is proven that excellent moldability (thin plate moldability) in conformity with a mold for producing a thin plate is achieved when the content ratio of the reinforced fiber and the mixing ratio of the resin component are the above-described predetermined ratios.

It is also proven that Examples 1 to 13 achieve high strength (specific strength) and rigidity (specific rigidity).

Therefore, when the content ratio of the reinforced fiber and the mixing ratio of the resin component are the above-described predetermined ratios, excellent moldability (thin plate moldability) in conformity with a mold for producing a thin plate, and excellent strength (specific strength) and rigidity (specific rigidity) are achieved.

TABLE 1

| Example—Comparative Example No. | | | | | | Ex. 1 | Comp. Ex. 1 | Ex. 2 | Comp. Ex. 2 | Ex. 3 | Comp. Ex. 3 |
|---|---|---|---|---|---|---|---|---|---|---|---|
| Thin plate molding material | Resin composition (parts by mass) | Resin component | Double bond-containing curable polymer | Unsaturated polyester | Unsaturated polyester of Synthesis Example 1 | 40.0 | 40.0 | 40.0 | 40.0 | 40.0 | 40.0 |
| | | | | | Unsaturated polyester of Synthesis Example 2 | — | — | — | — | — | — |
| | | | | | Unsaturated polyester of Synthesis Example 3 | — | — | — | — | — | — |
| | | | | Vinyl ester | Vinyl ester of Synthesis Example 4 | — | — | — | — | — | — |
| | | | Double bond equivalent (g/eq.) | | | 263 | 263 | 263 | 263 | 263 | 263 |
| | | | Low profile agent | | Polyvinyl acetate | 6.0 | 6.0 | 6.0 | 6.0 | 6.0 | 6.0 |
| | | | | | Polystyrene | 5.0 | 5.0 | 5.0 | 5.0 | 5.0 | 5.0 |
| | | | | | Polyethylene fine powder | 3 | 3 | 3 | 3 | 3 | 3 |
| | | | Polymerizable monomer | | Styrene | 46 | 46 | 46 | 46 | 46 | 46 |
| | | | Polymerization inhibitor | | P-benzoquinone | 0.05 | 0.05 | 0.05 | 0.05 | 0.05 | 0.05 |
| | | | Curing catalyst | | BIC-75 (T-butyl peroxyisopropyl carbonate) | 1.3 | 1.3 | 1.3 | 1.3 | 1.3 | 1.3 |
| | | | Silane coupling agent | | 3-methacryl-oxypropyl trimethoxysilane | — | — | — | — | — | — |
| | | | Release agent | | Zinc stearate fine powder | 5 | 5 | 5 | 5 | 5 | 5 |
| | | | Thickener | | Magnesium oxide fine powder | 1.0 | 1.0 | 1.0 | 1.0 | 1.0 | 1.0 |
| | | Filling material | Second filler | | Heavy calcium carbonate | 25 | 55 | 45 | 5 | 13 | 45 |
| | | | First filler | | Glass ballon | 11 | 11 | 11 | 10 | 10.5 | 14 |
| | | | | | Milled carbon fiber | 5 | 5 | 5 | 5 | 5 | 5 |
| | Reinforced fiber (mass %) | | | | Glass fiber 1 (fiber length of 25.4 mm) | 47.0 | 37.0 | 41.0 | 56.0 | 52.0 | 46.0 |
| | | | | | Glass fiber 2 (fiber length of 6.4 mm) | — | — | — | — | — | — |

TABLE 1-continued

| | | | | | | | | | | |
|---|---|---|---|---|---|---|---|---|---|---|
| | | | | Carbon fiber (fiber length of 25.4 mm) | | — | — | — | — | — | — |
| Ratio of resin component in thin plate molding material | | | | | Mass % | 38.0 | 37.6 | 37.3 | 36.7 | 37.6 | 33.5 |
| | | | | | Vol % | 52.4 | 52.2 | 52.0 | 52.1 | 52.4 | 47.3 |
| Ratio of reinforced fiber in thin plate molding material | | | | | Vol % | 24.7 | 19.6 | 21.8 | 30.3 | 27.7 | 24.7 |

| | | | | | | Example—Comparative Example No. | | | |
|---|---|---|---|---|---|---|---|---|---|
| | | | | | | Ex. 4 | Comp. Ex. 4 | Ex. 5 | Ex. 6 |
| Thin plate molding material (parts by mass) | Resin composition | Resin component | Double bond-containing curable polymer | Unsaturated polyester | Unsaturated polyester of Synthesis Example 1 | 40.0 | 40.0 | 40.0 | 40.0 |
| | | | | | Unsaturated polyester of Synthesis Example 2 | — | — | — | — |
| | | | | | Unsaturated polyester of Synthesis Example 3 | — | — | — | — |
| | | | | Vinyl ester | Vinyl ester of Synthesis Example 4 | — | — | — | — |
| | | | Double bond equivalent (g/eq.) | | | 263 | 263 | 263 | 263 |
| | | | | | Polyvinyl acetate | 6.0 | 6.0 | 6.0 | 6.0 |
| | | | | | Polystyrene | 5.0 | 5.0 | 5.0 | 5.0 |
| | | | | | Polyethylene fine powder | 3 | 3 | 3 | 3 |
| | | | Polymerizable monomer | | Styrene | 46 | 46 | 46 | 46 |
| | | | Polymerization inhibitor | | P-benzoquinone | 0.05 | 0.05 | 0.05 | 0.05 |
| | | | Curing catalyst | | BIC-75 (T-butyl peroxyisopropyl carbonate) | 1.3 | 1.3 | 1.3 | 1.3 |
| | | | Silane coupling agent | | 3-methacryl-oxypropyl trimethoxysilane | — | — | — | — |
| | | | Release agent | | Zinc stearate fine powder | 5 | 5 | 5 | 5 |
| | | | Thickener | | Magnesium oxide fine powder | 1.0 | 1.0 | 1.0 | 1.0 |
| | | Filling material | Second filler | | Heavy calcium carbonate | 35 | 12 | 20 | 125 |
| | | | First filler | | Glass ballon | 12.5 | 8 | 9 | — |
| | | | | | Milled carbon fiber | 5 | 5 | 5 | — |
| | Reinforced fiber (mass %) | | | | Glass fiber 1 (fiber length of 25.4 mm) | 46.5 | 47.5 | 47.0 | 36.0 |
| | | | | | Glass fiber 2 (fiber length of 6.4 mm) | — | — | — | — |
| | | | | | Carbon fiber (fiber length of 25.4 mm) | — | — | — | — |
| Ratio of resin component in thin plate molding material | | | | | Mass % | 35.6 | 42.2 | 39.9 | 29.3 |
| | | | | | Vol % | 49.7 | 57.7 | 55.3 | 52.5 |
| Ratio of reinforced fiber in thin plate molding material | | | | | Vol % | 24.8 | 24.8 | 24.8 | 24.6 |

TABLE 2

| | | | | | | Example—Comparative Example No. | | | | |
|---|---|---|---|---|---|---|---|---|---|---|
| | | | | | | Ex. 7 | Ex. 8 | Ex. 9 | Ex. 10 | Ex. 11 |
| Thin plate molding material | Resin composition (parts by mass) | Resin component | Double bond-containing curable polymer | Unsaturated polyester | Unsaturated polyester of Synthesis Example 1 | 40.0 | 40.0 | 40.0 | — | — |
| | | | | | Unsaturated polyester of Synthesis Example 2 | — | — | — | 40.0 | — |

TABLE 2-continued

| | | | | | | | | | |
|---|---|---|---|---|---|---|---|---|---|
| | | | | Unsaturated polyester of Synthesis Example 3 | — | — | — | — | 40.0 |
| | | | Vinyl ester | Vinyl ester of Synthesis Example 4 | — | — | — | — | — |
| | | | Double bond equivalent (g/eq.) | | 263 | 263 | 263 | 171 | 392 |
| | | | Low profile agent | Polyvinyl acetate | 6.0 | 6.0 | 6.0 | 6.0 | 6.0 |
| | | | | Polystyrene | 5.0 | 5.0 | 5.0 | 5.0 | 5.0 |
| | | | | Polyethylene fine powder | 3 | 3 | 3 | 3 | 3 |
| | | | Polymerizable monomer | Styrene | 46 | 46 | 46 | 46 | 46 |
| | | | Polymerization inhibitor | P-benzoquinone | 0.05 | 0.05 | 0.05 | 0.05 | 0.05 |
| | | | Curing catalyst | BIC-75 (T-butyl peroxyisopropyl carbonate) | 1.3 | 1.3 | 1.3 | 1.3 | 1.3 |
| | | | Silane coupling agent | 3-methacryl-oxypropyl trimethoxysilane | — | 1.0 | — | — | — |
| | | | Release agent | Zinc stearate fine powder | 5 | 5 | 5 | 5 | 5 |
| | | | Thickener | Magnesium oxide fine powder | 1.0 | 1.0 | 1.0 | 1.0 | 1.0 |
| | Filling material | Second filler | | Heavy calcium carbonate | 33 | 120 | 90 | 25 | 25 |
| | | First filler | | Glass ballon | 11 | — | — | 11 | 11 |
| | | | | Milled carbon fiber | — | 5 | 25 | 5 | 5 |
| Reinforced fiber (mass %) | | | | Glass fiber 1 (fiber length of 25.4 mm) | 46.5 | 36.0 | 37.0 | 47.0 | 47.0 |
| | | | | Glass fiber 2 (fiber length of 6.4 mm) | — | — | — | — | — |
| | | | | Carbon fiber (fiber length of 25.4 mm) | — | — | — | — | — |
| Ratio of resin component in thin plate molding material | | | | Mass % | 37.6 | 29.4 | 30.1 | 38.0 | 38.0 |
| | | | | Vol % | 52.4 | 52.5 | 52.3 | 52.4 | 52.4 |
| Ratio of reinforced fiber in thin plate molding material | | | | Vol % | 24.7 | 24.5 | 24.5 | 24.7 | 24.7 |

| | | | | | Example—Comparative Example No. | | | |
|---|---|---|---|---|---|---|---|---|
| | | | | | Ex. 12 | Ex. 13 | Comp. Ex. 5 | Comp. Ex. 6 |
| Thin plate molding material | Resin composition (parts by mass) | Resin component | Double bond-containing curable polymer | Unsaturated polyester | Unsaturated polyester of Synthesis Example 1 | 25.0 | 25.0 | 40.0 | 40.0 |
| | | | | | Unsaturated polyester of Synthesis Example 2 | — | — | — | — |
| | | | | | Unsaturated polyester of Synthesis Example 3 | — | — | — | — |
| | | | | Vinyl ester | Vinyl ester of Synthesis Example 4 | 15.0 | 15.0 | — | — |
| | | | Double bond equivalent (g/eq.) | | 297 | 297 | 263 | 263 |
| | | | Low profile agent | Polyvinyl acetate | 6.0 | 6.0 | 6.0 | 7.0 |
| | | | | Polystyrene | 5.0 | 5.0 | 5.0 | 5.0 |
| | | | | Polyethylene fine powder | 3 | 3 | 3 | 3 |
| | | | Polymerizable monomer | Styrene | 46 | 46 | 46 | 45 |
| | | | Polymerization inhibitor | P-benzoquinone | 0.05 | 0.05 | 0.05 | 0.04 |
| | | | Curing catalyst | BIC-75 (T-butyl peroxyisopropyl carbonate) | 1.3 | 1.3 | 1.3 | 1 |
| | | | Silane coupling agent | 3-methacryl-oxypropyl trimethoxysilane | — | — | — | — |
| | | | Release agent | Zinc stearate fine powder | 5 | 5 | 5 | 5 |
| | | | Thickener | Magnesium oxide fine powder | 1.0 | 1.0 | 1.0 | 1.0 |

TABLE 2-continued

| | | | | | | | |
|---|---|---|---|---|---|---|---|
| | Filling material | Second filler | Heavy calcium carbonate | 25 | 25 | 25 | 122 |
| | | First filler | Glass ballon | 11 | 11 | 11 | 8.6 |
| | | | Milled carbon fiber | 5 | 5 | 5 | |
| Reinforced fiber (mass %) | | | Glass fiber 1 (fiber length of 25.4 mm) | 47.0 | 37.0 | — | 33.0 |
| | | | Glass fiber 2 (fiber length of 6.4 mm) | — | — | 47.0 | — |
| | | | Carbon fiber (fiber length of 25.4 mm) | — | 10.0 | — | — |
| Ratio of resin component in thin plate molding material | | | Mass % | 38.0 | 38.0 | 38.0 | 30.1 |
| | | | Vol % | 52.4 | 52.4 | 52.4 | 47.9 |
| Ratio of reinforced fiber in thin plate molding material | | | Vol % | 24.7 | 24.8 | 24.7 | 20.0 |

TABLE 3

| | | | | Example—Comparative Example No. | | | | | |
|---|---|---|---|---|---|---|---|---|---|
| | | | | Ex. 1 | Comp. Ex. 1 | Ex. 2 | Comp. Ex. 2 | Ex. 3 | Comp. Ex. 3 |
| Evaluation | Density | | g/mL | 1.38 | 1.36 | 1.38 | 1.40 | 1.37 | 1.41 |
| | Mold shrinkage rate | | % | 0.06 | 0.08 | 0.07 | 0.04 | 0.05 | 0.05 |
| | Flexural strength at 80° C. | | MPa | 210 | 171 | 188 | 248 | 223 | 216 |
| | Flexural modulus of elasticity at 80° C. | | GPa | 11.2 | 8.8 | 9.4 | 12.6 | 11.8 | 11.8 |
| | Specific strength at 80° C. | | MPa/(g/cm$^3$) | 152 | 126 | 136 | 177 | 163 | 153 |
| | | | Determination | Excellent | Bad | Fair | Excellent | Excellent | Excellent |
| | Specific rigidity at 80° C. | | $^3\sqrt{}$MPa/(g/cm$^3$) | 16.2 | 15.2 | 15.3 | 16.6 | 16.6 | 16.1 |
| | | | Determination | Excellent | Good | Good | Excellent | Excellent | Excellent |
| Thin plate moldability | Thickness of molded article 1.3 mm | Amount of burr | cm$^3$ | 2.0 | 2.9 | 2.4 | 4.1 | 2.6 | 2.3 |
| | | | Determination | Good | Good | Good | Good | Good | Good |
| | | Molding filling state | Observed state | Good | Good | Good | Resin rich | Good | Short shot |
| | | Number of cracked articles in demolding | Cracked article | 0 | 7 | 3 | 5 | 0 | 3 |
| | | | Determination | Good | Bad | Fair | Bad | Good | Fair |
| | Thickness of molded article 2.2 mm | Amount of burr | cm$^3$ | 1.9 | 2.5 | 2.1 | 2.3 | 2.2 | 2.7 |
| | | | Determination | Good | Good | Good | Good | Good | Good |
| | | Molding filling state | Observed state | Good | Good | Good | Good | Good | Good |
| | | | Determination | Good | Good | Good | Good | Good | Good |
| | | Number of cracked articles in demolding | Cracked article | 0 | 1 | 0 | 1 | 0 | 0 |
| | | | Determination | Good | Good | Good | Good | Good | Good |

| | | | | Example—Comparative Example No. | | | |
|---|---|---|---|---|---|---|---|
| | | | | Ex. 4 | Comp. Ex. 4 | Ex. 5 | Ex. 6 |
| Evaluation | Density | | g/mL | 1.39 | 1.35 | 1.38 | 1.78 |
| | Mold shrinkage rate | | % | 0.06 | 0.08 | 0.07 | 0.06 |
| | Flexural strength at 80° C. | | MPa | 199 | 196 | 196 | 252 |
| | Flexural modulus of elasticity at 80° C. | | GPa | 11.3 | 10.1 | 10.1 | 12.6 |
| | Specific strength at 80° C. | | MPa/(g/cm$^3$) | 143 | 145 | 142 | 142 |
| | | | Determination | Good | Good | Good | Good |
| | Specific rigidity at 80° C. | | $^3\sqrt{}$MPa/(g/cm$^3$) | 16.1 | 16.0 | 15.7 | 13.1 |
| | | | Determination | Excellent | Excellent | Good | Fair |
| Thin plate moldability | Thickness of molded article 1.3 mm | Amount of burr | cm$^3$ | 1.8 | 10.7 | 6.8 | 5.9 |
| | | | Determination | Good | Bad | Fair | Fair |
| | | Molding filling state | Observed state | Good | Good | Good | Good |
| | | Number of cracked articles in demolding | Cracked article | 0 | 6 | 3 | 0 |
| | | | Determination | Good | Bad | Fair | Good |

TABLE 3-continued

|  |  |  |  |  |  |  |  |
|---|---|---|---|---|---|---|---|
| Thickness of molded article 2.2 mm | Amount of burr | cm³ | 1.9 | 4.4 | 3.0 | 3.9 |
|  |  | Determination | Good | Fair | Good | Fair |
|  | Molding filling state | Observed state | Good | Good | Good | Good |
|  |  | Determination | Good | Good | Good | Good |
|  | Number of cracked articles in demolding | Cracked article | 0 | 0 | 0 | 0 |
|  |  | Determination | Good | Good | Good | Good |

TABLE 4

|  |  |  |  | Example—Comparative Example No. | | | | |
|---|---|---|---|---|---|---|---|---|
|  |  |  |  | Ex. 7 | Ex. 8 | Ex. 9 | Ex. 10 | Ex. 11 |
| Evaluation | Density |  | g/mL | 1.39 | 1.76 | 1.72 | 1.38 | 1.36 |
|  | Mold shrinkage rate |  | % | 0.06 | 0.06 | 0.05 | 0.03 | 0.08 |
|  | Flexural strength at 80° C. |  | MPa | 201 | 266 | 270 | 182 | 179 |
|  | Flexural modulus of elasticity at 80° C. |  | GPa | 9.6 | 13.6 | 15.7 | 11.8 | 8.4 |
|  | Specific strength at 80° C. |  | MPa/(g/cm³) | 145 | 151 | 157 | 132 | 132 |
|  |  |  | Determination | Good | Excellent | Excellent | Fair | Fair |
|  | Specific rigidity at 80° C. |  | ³√MPa/(g/cm³) | 15.3 | 13.6 | 14.6 | 16.5 | 14.9 |
|  |  |  | Determination | Good | Fair | Good | Excellent | Good |
|  | Thin plate moldability | Thickness of molded article 1.3 mm | Amount of burr | cm³ | 2.9 | 3.4 | 2.7 | 2.2 | 2.4 |
|  |  |  |  | Determination | Good | Good | Good | Good | Good |
|  |  |  | Molding filling state | Observed state | Good | Good | Good | Good | Good |
|  |  |  |  | Determination | Good | Good | Good | Good | Good |
|  |  |  | Number of cracked articles in demolding | Cracked article | 0 | 0 | 0 | 0 | 0 |
|  |  |  |  | Determination | Good | Good | Good | Good | Good |
|  |  | Thickness of molded article 2.2 mm | Amount of burr | cm³ | 2.9 | 3.1 | 2.8 | 2.1 | 2.0 |
|  |  |  |  | Determination | Good | Good | Good | Good | Good |
|  |  |  | Molding filling state | Observed state | Good | Good | Good | Good | Good |
|  |  |  |  | Determination | Good | Good | Good | Good | Good |
|  |  |  | Number of cracked articles in demolding | Cracked article | 0 | 0 | 0 | 0 | 0 |
|  |  |  |  | Determination | Good | Good | Good | Good | Good |

|  |  |  |  | Example—Comparative Example No. | | | |
|---|---|---|---|---|---|---|---|
|  |  |  |  | Ex. 12 | Ex. 13 | Comp. Ex. 5 | Comp. Ex. 6 |
| Evaluation | Density |  | g/mL | 1.38 | 1.37 | 1.39 | 1.58 |
|  | Mold shrinkage rate |  | % | 0.09 | 0.01 | 0.09 | 0.09 |
|  | Flexural strength at 80° C. |  | MPa | 222 | 225 | 133 | 173 |
|  | Flexural modulus of elasticity at 80° C. |  | GPa | 11.9 | 13.1 | 7.9 | 9.2 |
|  | Specific strength at 80° C. |  | MPa/(g/cm³) | 161 | 164 | 96 | 109 |
|  |  |  | Determination | Excellent | Excellent | Bad | Bad |
|  | Specific rigidity at 80° C. |  | ³√MPa/(g/cm³) | 16.5 | 17.2 | 14.3 | 13.3 |
|  |  |  | Determination | Excellent | Excellent | Fair | Fair |
|  | Thin plate moldability | Thickness of molded article 1.3 mm | Amount of burr | cm³ | 3.3 | 2.9 | 12.3 | 0.5 |
|  |  |  |  | Determination | Good | Good | Bad | Good |
|  |  |  | Molding filling state | Observed state | Good | Good | Good | Short shot |
|  |  |  | Number of cracked articles in demolding | Cracked article | 0 | 0 | 7 | 2 |
|  |  |  |  | Determination | Good | Good | Bad | Fair |
|  |  | Thickness of molded article 2.2 mm | Amount of burr | cm³ | 2.5 | 3.1 | 6.7 | 2.2 |
|  |  |  |  | Determination | Good | Good | Fair | Good |
|  |  |  | Molding filling state | Observed state | Good | Good | Good | Good |
|  |  |  |  | Determination | Good | Good | Good | Good |
|  |  |  | Number of cracked articles in demolding | Cracked article | 0 | 0 | 3 | 0 |
|  |  |  |  | Determination | Good | Good | Fair | Good |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The thin plate molding material and molded article of the present invention can suitably be used for various components for building materials, housings, casting materials, machine components, electronic or electric components, vehicles, ships, and aircrafts.

The invention claimed is:

1. A thin plate molding material for molding a molded article having a thickness of 1.5 mm or less, comprising:
   a resin composition containing a resin component and a filling material; and
   a reinforced fiber with a fiber length of 10 mm or more and 60 mm or less, wherein
   a content ratio of the reinforced fiber is 21 vol % or more and 28 vol % or less,
   a mixing ratio of the resin component is 49 vol % or more and 56 vol % or less,
   the filling material contains a filler having an average value of maximum particle lengths of 15 μm or more and 300 μm or less, or a filler having an average value of maximum particle lengths of less than 15 μm,
   the resin component contains a double bond-containing curable polymer,
   the double bond-containing curable polymer has a double bond equivalent of 200 g/eq. or more and 297 g/eq. or less,
   the first filler contains a hollow glass with an average value of maximum particle lengths of 15 μm or more and 50 μm or less, and milled carbon fibers with an average value of maximum lengths of 100 μm or more and 300 μm or less, and
   a mixing ratio of the hollow glass to 100 parts by mass of a total amount of the hollow glass and the milled carbon fibers is 60 parts by mass or more and 80 parts by mass or less.

2. The thin plate molding material according to claim 1, wherein the reinforced fiber has an aspect ratio of 500 or more.

3. A molded article comprising: a cured product of the thin plate molding material according to claim 1, the molded article having a thickness of 1.5 mm or less.

* * * * *